US009406132B2

(12) United States Patent
Martinez Bauza et al.

(10) Patent No.: US 9,406,132 B2
(45) Date of Patent: Aug. 2, 2016

(54) VISION-BASED QUALITY METRIC FOR THREE DIMENSIONAL VIDEO

(75) Inventors: Judit Martinez Bauza, San Diego, CA (US); Mashhour M. Solh, Alanta, GA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 13/094,607

(22) Filed: Apr. 26, 2011

(65) Prior Publication Data

US 2012/0014456 A1    Jan. 19, 2012

Related U.S. Application Data

(60) Provisional application No. 61/364,940, filed on Jul. 16, 2010.

(51) Int. Cl.
*H04N 7/26* (2006.01)
*G06T 7/00* (2006.01)
(Continued)

(52) U.S. Cl.
CPC ............. *G06T 7/0022* (2013.01); *G06T 7/0075* (2013.01); *H04N 19/42* (2014.11); *H04N 19/597* (2014.11); *G06T 2207/10021* (2013.01); *G06T 2207/10028* (2013.01); *H04N 13/0275* (2013.01)

(58) Field of Classification Search
CPC  G06T 7/0022; G06T 7/0075; H04N 13/0275; H04N 19/00769
USPC ...................................... 375/240; 348/42–43
See application file for complete search history.

(56) References Cited

U.S. PATENT DOCUMENTS

| 6,046,763 A | 4/2000 | Roy |
| 2003/0206652 A1 | 11/2003 | Nister |

(Continued)

FOREIGN PATENT DOCUMENTS

| CN | 1981295 A | 6/2007 |
| JP | 2005026756 A | 1/2005 |

(Continued)

OTHER PUBLICATIONS

Chun-Chi Chen et al., "A Synthesis-Quality-Oriented Depth Refinement Scheme for MPEG Free Viewpoint Television (FTV)", Multimedia, 2009, ISM 09, 11TH IEEE International Symposium on, IEEE, Piscataway, NJ, USA, Dec. 14, 2009, pp. 171-178, XP031589024, ISBN: 978-1-4244-5231-6.

(Continued)

*Primary Examiner* — Jamie Atala
*Assistant Examiner* — Nguyen Truong
(74) *Attorney, Agent, or Firm* — Shyam K. Parekh

(57) ABSTRACT

In general, techniques are described for determining a vision-based quality metric for three-dimensional (3D) video. A device (12, 14) comprising a 3D analysis unit (24, 48) may implement these techniques to compute a 3D objective metric (36, 60). The 3D analysis unit (24, 48) estimates an ideal depth map (62, 70) that would generate a distortion limited image view using DIBR-based 3D video data (34) and then derives one or more distortion metrics (64, 72) based on quantitative comparison of the ideal depth map (62, 70) and a depth map (28, 58) used in the generation of the DIBR-based 3D video data (34). Based on the derived one or more distortion metrics (64, 72), the 3D analysis unit (24, 48) computes the objective metric (36, 60) to quantify visual quality of DIBR-based video data (34). The 3D objective metric (36, 60) may be used to alter or otherwise adjust depth estimation and encoding/decoding parameters to correct for expected visual discomfort.

40 Claims, 7 Drawing Sheets

(51) Int. Cl.
 *H04N 19/597* (2014.01)
 *H04N 19/42* (2014.01)
 *H04N 13/02* (2006.01)

(56) References Cited

U.S. PATENT DOCUMENTS

| | | |
|---|---|---|
| 2007/0296721 A1 | 12/2007 | Chang et al. |
| 2009/0129667 A1 | 5/2009 | Ho et al. |
| 2010/0182445 A1 | 7/2010 | Chiang |
| 2011/0142309 A1* | 6/2011 | Zhang ............... H04N 13/0022 382/128 |

FOREIGN PATENT DOCUMENTS

| | | |
|---|---|---|
| JP | 2008505522 A | 2/2008 |
| WO | WO-2006003611 A2 | 1/2006 |
| WO | WO-2010025458 A1 | 3/2010 |

OTHER PUBLICATIONS

International Search Report and Written Opinion—PCT/US2011/044277, ISA/EPO—Sep. 1, 2011.
Scherba D J et al., "Depth Map Calibration by Stereo and Wireless Sensor Network Fusion", Information Fusion, 2005 7th International Conference on Philadelphia, PA, USA Jul. 25-28, 2005, Piscataway, NJ, USA,IEEE, vol. 2, Jul. 25, 2005, pp. 1540-1547, XP010892404, DOI: 10.1109/ICIF.2005.1592038 ISBN: 978-0-7803-9286-1.
Solh M., et al., "3VQM: A Vision-Based Quality Measure for DIBR-Based 3D Videos", in Multimedia and Expo (ICME), IEEE International Conference, 2011, pp. 1-6.
Solh M., et al., "A No-Reference Quality Measure for DIBR-Based 3D Video", in Multimedia and Expo (ICME), IEEE International Conference, 2011, pp. 1-6.

* cited by examiner

US 9,406,132 B2

VISION-BASED QUALITY METRIC FOR THREE DIMENSIONAL VIDEO

This application claims the benefit of U.S. Provisional Application No. 61/364,940, filed Jul. 16, 2010, the entire content of which is incorporated herein by reference.

TECHNICAL FIELD

The disclosure relates to video rendering and, more particularly, three dimensional video rendering.

BACKGROUND

Three-dimensional (3D) video capture devices generally include two cameras in a formation that generally mimics the arrangement of the human eyes. The two cameras each capture two-dimensional (2D) video data of a scene although from slightly shifted perspectives that mimic the perception of the scene from the respective left and right human eye. This mimicked left and right eye 2D video data is often referred to as a left and right eye 2D view, respectively. From this mimicked left and right eye 2D view, depth information can be extracted given the focal length of the cameras and the baseline distance between the centers of the cameras. This depth information may be used to augment one or more of the left and/or right eye 2D views to form 3D video data.

Typically, the depth information is provided in conjunction with only one of the views as the other view can be generated from the provided view and the depth information. This technique to render the other view from the provided view and the depth information is referred to as depth-image-based rendering (DIBR). DIBR reduces the size of 3D video data considering that only one view is required and that the depth information may be encoded as a gray-scale image, which consumes considerably less space than full color 2D video data. The resulting 3D video data in DIBR may be further compressed to further reduce the size of the video data. Compression of this 3D video data may facilitate wireless delivery of this 3D video data to, for example, a wireless display.

A 3D video encoder may implement a depth map estimation module to produce 3D video data that includes a single view and depth information from the two captured views. A 3D video decoder may implement DIBR to render the additional view from the provided view and the depth information for presentation by a 3D display device. Each of the 3D video encoder and 3D video decoder may additionally perform some analysis of the 3D video data to evaluate the quality of the views. Commonly, the 3D video encoder and decoder utilize existing 2D quality metrics (2DQM) to assess the quality of each of these views and combine these 2D quality metrics in a manner that speculatively reflects the quality of the captured 3D video and the rendered 3D video data, respectively. Some of these 2D quality metrics have been augmented to consider depth map metrics to further refine the resulting quality metrics for the 3D video data. In response to this formulated pseudo-3D quality metric, the 3D video encoder may revise the generation of the depth map from the two captured views and the 3D video decoder may revise the generation of the view from the provided view and the depth information.

SUMMARY

In general, techniques are described for providing an objective three dimensional (3D) quality metric (3DQM) capable of both enabling proper discovery of errors and their sources and fine tuning of both depth map estimation and depth map and view encoding/decoding. That is, rather than utilize 2D quality metrics (2DQM) to assess the quality of each of the views individually and combine these 2D quality metrics to form what may be referred to as a pseudo-3D quality metric, the techniques may avoid speculative combinations of 2DQMs in favor of an objective 3DQM computed from an estimate of an ideal depth map that provides for distortion limited image view using DIBR-based 3D video data. Moreover, the techniques may isolate various operations in the 3D video encoder, 3D video decoder, and/or wireless channel so as to potentially better identify the source of errors in comparison to the speculative 3DQM commonly used to evaluate DIBR-based 3D video data. In this way, the techniques may provide an objective 3DQM capable of both enabling proper discovery of errors and their sources and fine tuning of both depth map estimation and depth map and view encoding/decoding.

In one aspect, a method for obtaining an objective metric to quantify the visual quality of depth-image-based rendering (DIBR)-based three-dimensional (3D) video data comprises estimating an ideal depth map that would generate a distortion limited image view using DIBR-based 3D video data, deriving one or more distortion metrics based on quantitative comparison of the ideal depth map to a depth map used in the generation of the DIBR-based 3D video data and computing the objective metric to quantify visual quality of the DIBR-based 3D video data based on the derived one or more distortion metrics.

In another aspect, a device obtains an objective metric to quantify the visual quality of depth-image-based rendering (DIBR)-based three-dimensional (3D) video data. The device comprises a 3D analysis unit that computes the 3D objective metric. The 3D analysis unit includes an ideal depth estimation unit that estimates an ideal depth map that would generate a distortion limited image view using DIBR-based 3D video data, a distortion metric computation unit that derives one or more distortion metrics based on quantitative comparison of the ideal depth and a depth map used in the generation of the DIBR-based 3D video data, and an objective metric computation unit that computes the objective metric to quantify visual quality of DIBR-based video data based on the derived one or more distortion metrics.

In another aspect, an apparatus obtains an objective metric to quantify the visual quality of depth-image-based rendering (DIBR)-based three-dimensional (3D) video data. The apparatus comprises means for estimating an ideal depth map that would generate a distortion limited image view using DIBR-based 3D video data, means for deriving one or more distortion metrics based on quantitative comparison of the ideal depth map to a depth map used in the generation of the DIBR-based 3D video data, and means for computing the objective metric to quantify visual quality of the DIBR-based 3D video data based on the derived one or more distortion metrics.

In another aspect, a non-transitory computer-readable medium comprising instructions that, when executed, cause one or more processor to estimate an ideal depth map that would generate a distortion limited image view using DIBR-based 3D video data, derive one or more distortion metrics through based on quantitative comparison of the ideal depth map to a depth map used in the generation of the DIBR-based 3D video data, and compute the objective metric to quantify visual quality of the DIBR-based 3D video data as a combination of based on the derived one or more distortion metrics.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
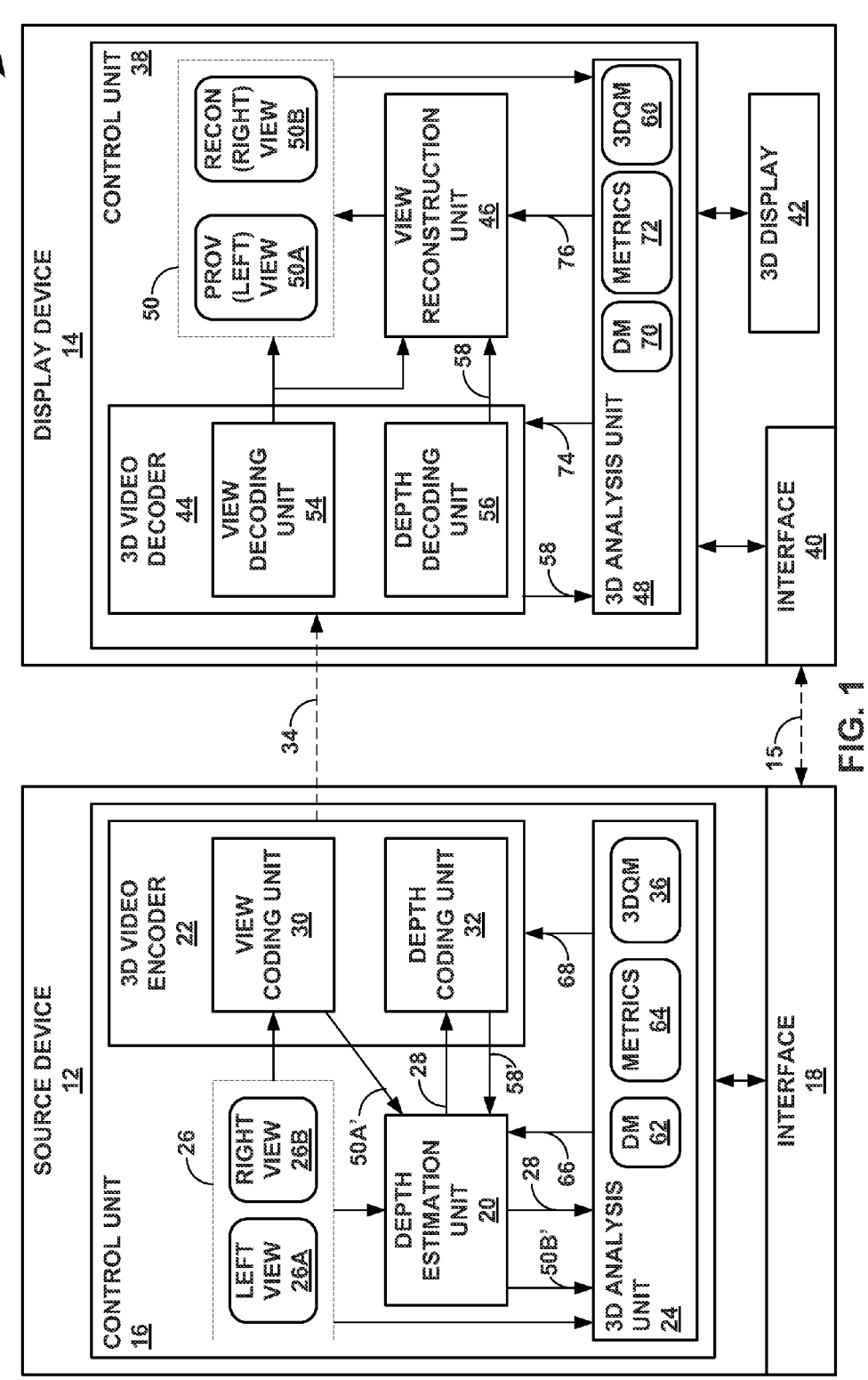
FIG. 1 is a block diagram illustrating an exemplary system that implements the objective three-dimensional (3D) quality metric (3DQM) derivation techniques described in this disclosure.

FIG. 1 is a block diagram illustrating an exemplary system 10 that implements the objective three-dimensional (3D) quality metric (3DQM) derivation techniques described in this disclosure. In the example of FIG. 1, system 10 includes a source device 12 and a display device 14, which communicate with one another via wireless communication channel 15. Source device 12 may include a general purpose multimedia device, such as a personal computer, a workstation, a personal digital assistant (PDA), a mobile phone (including a so-called "smart phone"), or any other type of device comprising a general purpose processor capable of executing software and, particularly, multimedia software. Source device 14 may alternatively comprise a dedicated multimedia device, such as a video camcorder, a digital video disc (DVD) player, a television, a set-top box (STB), a compact disc (CD) player, a digital media player (e.g., a so-called "MP3" player or a combination MP3/MP4 player, as well as, other media players that play other formats, including advanced audio coding (AAC), Windows media video (WMV) and Waveform audio video (WAV) formats), a digital video recorder (DVR), a global positioning system (GPS) device, or any other device dedicated to a set of one or more multimedia applications and that typically does not enable user control over the loading and execution of multimedia software.

Display device 14 generally represents any device capable of video playback via a display. Display device 16 may comprise a television (TV) display, which may be referred to as a 3D video display device or a hybrid 2D/3D video display device, or any other type of display device capable of displaying 3D video data. Display device 14 may alternatively comprise any other device with a display, such as a laptop, a personal media player (PMP), a desktop computer, a workstation, a PDA, and a portable digital media player (such as a portable DVD player).

For purposes of illustration, display device 14 is assumed to represent a wireless full 3D television that communicates with source device 12 wirelessly. The techniques of this disclosure should not, however, be limited to wireless full 3D televisions, but may be implemented in a number of different ways with respect to different configurations of various devices. For example, rather than a display device, the techniques may be implemented with respect to a set-top box or other discrete visual or audio/visual device that is separate from a 3D-ready display or television but that interfaces with the 3D-ready display or television. As used in this disclosure, a full 3D display refers to a 3D display that integrates all of the necessary hardware logic, modules, units, software or other components to readily display and enable the viewing of 3D video data. A 3D-ready display, as used in this disclosure, refers to a 3D display that does not include all of the logic, modules, units, software or other components to enable the receipt, decoding, presentation and viewing of 3D video data. 3D-ready displays generally require a separate device, hardware card or other component to enable receipt, decoding, presentation and viewing of 3D video data.

Source device 12 includes a control unit 16 and an interface 18. Control unit 16 may represent one or more processors (not shown in FIG. 1) that execute software instructions, such as those used to define a software or computer program, stored to a computer-readable storage medium (again, not shown in FIG. 1), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described in this disclosure. Alternatively, control unit 16 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Interface 18 represents an interface by which to communicate wirelessly with another device, such as display device 14. While not shown in the example of FIG. 1, source device 12 may include additional interfaces to communicate via a wired or wireless connection with other devices. These additional interfaces may comprise, for example, a Bluetooth™ interface, a wireless cellular interface, a high-definition multimedia interface (HDMI), a micro-HDMI, a universal system bus (USB) interface, a external Serial Advanced Technology Attachment (eSATA) interface, a serial interface, a separate video (s-video) interface, a component video interface, an RCA interface, or any other type of wired or wireless interface for communicating with another device.

In the example of FIG. 1, control unit 16 of source device 12 includes a number of units 20-24 that may be implemented collectively or separately as one or more hardware units or a combination of software and one or more hardware units. Depth estimation unit 20 represents a unit that estimates depth information 28 based on 3D video data 26, which includes a left view 26A and a right view 26B. 3D video data 26 may be captured using a 3D video capture device that includes a first 2D video capture device, e.g., a first camera, and a second 2D video capture device, e.g., a second camera, where the first and second 2D video capture devices are positioned to mimic the placement of the left and right human eyes within a human head. The first 2D video capture device may capture 2D video data that mimics a view of a scene from the left human eye while the second 2D video capture device may capture 2D video data that mimics a view of the same scene from the right human eye. Left view 26A represents the 2D video data captured by the first 2D video capture device and the right view 26B represents the 2D video data captured by the second 2D video capture device.

While not shown in FIG. 1 for ease of illustration, source device 12 may include additional units, modules, logic, hardware or other components, such as the above-noted 3D video capture device, for capturing 3D video data 26. Alternatively, source device 12 may act as an archive or repository for storing 3D video data 26. In some instances, source device 12 may receive 3D video data 26 wirelessly via interface 18 included within source device 12. In some instances, these external devices may interface with source device 12 via interface 18 to store 3D video data within source device 12.

3D video encoder 22 represents a unit that encodes 3D video data 26 and depth information 28 in a compressed manner. More specifically, 3D video encoder 22 represents a unit that encodes one of views 26A, 26B of 3D video data 26 and depth information 28 in a manner that facilitate depth-image-based rendering (DIBR). DIBR involves rendering a virtual view from a provided view and depth information. The benefit of DIBR is that only a single one of the left and right views needs to be transmitted rather than two views. Moreover, DIBR provides for depth information that is typically provided as a gray scale image or so-called depth map that may be significantly smaller in size than the other view. A decoder that implements DIBR may then render or otherwise generate the view that is not sent from the depth map and the provided view. 3D video encoder 22 may further compress the provided one of views 26A, 26B and depth information 28 to further compress 3D video data 26. 3D video encoder includes a view coding unit 30 to compresses one of views 26A, 26B and a depth coding unit 32 to compress depth information 28. 3D video encoder may format or otherwise package or encapsulate the encoded view and depth information as encoded DIBR-based 3D video data 34.

3D analysis unit 24 represents a unit that performs or otherwise implements the techniques described in this disclosure to generate a 3D quality metric 36 ("3DQM 36") that objectively evaluates the quality of encoded DIBR-based 3D video data 34. The 3DQM may also be referred to in this disclosure as a 3D video quality metric (3VQM). While shown as a unit separate from depth estimation unit 20 and 3D video encoder 22, 3D analysis unit 24 may alternatively be integrated into one or both of depth estimation unit 20 and 3D video encoder 22 to perform or otherwise implement the techniques described in this disclosure in more detail below.

As further shown in the example of FIG. 1, display device 14 includes a control unit 38, which may be substantially similar to control unit 16 of source device 12, and interface 40, which may be substantially similar to interface 18 of source device 12. Display device 14 also includes a 3D display 42 that represents any display capable of presenting 3D video data for consumption by a viewer of display device 14, including stereoscopic displays that may require shutter, polarized or color classes and auto-stereoscopic displays that do not require glasses or any other equipment to view content in 3D. 3D Display 42 may comprise any type of display, including an organic light emitting diode (OLED) display, a light emitting diode (LED) display, a plasma display, and a cathode-ray tube (CRT) display. Control unit 16 of display device 14 includes a number of units 44-48 that may be implemented collectively or separately as one or more hardware units or a combination of software and one or more hardware units.

3D video decoder 44 represents a unit that decodes encoded DIBR-based 3D video data 34 to produce a provided view 50A, which is assumed for purposes of illustration to be a left view 50A, and depth information 52. 3D video decoder 44 includes a view decoding unit 54 and a depth decoding unit 56. 3D video decoder 44 may implement view decoding unit 54 and depth decoding unit 56 individually as separate hardware unit or as a single hardware unit that may or may not implement some functionality described in this disclosure by executing software or instructions. View decoding unit 54 represents a unit that decodes the encoded provided view of DIBR-based video data 34 to generate provided view 50A. Depth decoding unit 56 represents a unit that decodes the encoded depth map or depth information to generate depth information 58.

View reconstruction unit 46 implements DIBR to reconstruct right view 50B based on provided view 50A and depth information 58. Right view 50B may be referred to as reconstruction view 50B ("recon (right) view 50B") for this reason. View reconstruction unit 46 may implement operations inverse to those implemented by depth estimation unit 20 to reconstruct right view 50B. View reconstruction unit 46 may perform depth-image based rendering (DIBR), which is an operation or process that view reconstruction unit 46 implements involving the use of the depth map to map content from one view, i.e., the provided view in this example, to a given location in the other view. View reconstruction unit 46 may then implement various processes to fill empty locations in the generated view (which are often referred to as "holes"). 3D analysis unit 48 performs the techniques described in this disclosure similar to those performed by 3D analysis unit 24 although augmented, for reasons described in more detail below, to account for the difference in information available to 3D analysis unit 48.

Initially, source device 12 may receive 3D video data 26. In some instances, source device 12 receives 3D video data 26 from a 3D capture device included within or coupled either via a wired or wireless connection to source device 12. Alternatively, as noted above, source device 12 receives 3D video data 26 via interface 18 or one of the other additional interfaces listed above. Source device 12 then encodes 3D video data 26 to compress this 3D video data 26 for delivery via interface 18 and wireless communication channel 15 to display device 14. While not shown in the example of FIG. 1, control unit 16 may include a user interface unit or module that presents one or more user interfaces with which a user may interact to initiate the encoding and transfer of 3D video data 26 to display device 14.

Once the encoding and delivery of 3D video data 26 is initiated, control unit 16 of source device 12 invokes depth estimation unit 20 to determine depth information 28. Control unit 16 also invokes 3D video encoder 22 to encode one of views 26A, 26B and depth information 28. As noted above, it is assumed that 3D video encoder 22 encodes left view 26A. Given this assumption, 3D video encoder 22 invokes view coding unit 20 to encode left view 26A and depth coding unit 32 to encode depth information 28. 3D video encoder 22 outputs encoded DIBR-based 3D video data 34, which is transmitted via interface 18 and wireless communication channel 15 to display device 14.

Interface 40 receives this encoded DIBR-based 3D video data 34 and forwards this video data 34 to 3D video decoder 44 of control unit 38 included within display device 14. 3D video decoder 44 invokes view decoding unit 54 to decode encoded left view 26A. View decoding unit 54 decodes encoded left view 26 to generate provided view 50A. 3D video decoder 44 also invokes depth decoding unit 56 to decode encoded depth information 28 of encoded DIBR-based 3D video data 34. Depth decoding unit 56 decodes encoded depth information 28 to generate depth information 58. Control unit 38 the invokes view reconstruction unit 46 to reconstruct right view 50B, whereupon view reconstruction unit 46 forms reconstructed right view 50B based on provided view 50A and depth information 58 using DIBR. Left and right views 50A, 50B are forwarded as 3D video data 50 to 3D display 42, which presents this 3D video data 50 to a viewer of 3D display 42.

Throughout this process of DIBR-based encoding and DIBR-based decoding, each of 3D analysis units 24, 48 determines a 3DQM 36 and 60, respectively, in accordance with the techniques described in this disclosure. Referring first to 3D analysis unit 24 of source device 12, 3D analysis unit 24 estimates an ideal depth map that would generate distortion limited image view using DIBR-based 3D video data in accordance with the techniques of this disclosure described in more detail below. Briefly, 3D analysis unit 24 estimates the ideal depth map based at least on a generated or reconstructed view. That is, while not shown in the example of FIG. 1, 3D video encoder 22 also includes a 3D video decoder similar to 3D video decoder 44 of display device 14. Likewise, depth estimation unit 20 may also include a view reconstruction unit 46 similar to view reconstruction unit 46 so as to implement DIBR and reconstruct a generated view from the output of the 3D video decoder included within 3D video encoder 22. Control unit 16 includes these decoding and view reconstruction units to facilitate depth estimation and subsequent encoding of the selected view, i.e., left view 26A in this example, and depth information 28. Depth estimation unit 20 may therefore output a reconstructed right view 50B' based on decoded depth information 58' and decoded left view 50A'. 3D analysis unit 24 then generates an ideal depth map 62 ("DM 62") based at least on generated or reconstructed view 50B'.

Given 3D video data 26 in its entirety, rather than only DIBR-based video data that includes a single reference or provided view and a depth map, 3D analysis unit 24 may compute ideal depth map 62 as a function of both the original view, i.e., right view 26B, and the generated or reconstructed view 50B'. This so-called "full reference" context in which 3D analysis unit 24 has access to the captured 3D video data 26 may provide for a more accurate depth map 62. While described with respect to this "full reference" context, 3D analysis unit 24 may implement the techniques described in this disclosure with respect to other contexts, including a so-called "reduced reference" context and a "no reference" context, both of which are described in more detail below.

Typically, 3D analysis unit 24 of source device 12 computes ideal depth map 62 in the either the full reference or reduced reference context, while 3D analysis unit 48 computes its depth map 70 in either the reduced reference or no reference context. The difference in how these two 3D analysis units 24 compute ideal depth maps 62, 70 is a function of the availability of 3D video data, as described in more detail below. The full reference context refers to instances where 3D video data 26 is fully available, i.e., both of views 26A, 26B are available rather than just one of views 26A, 26B. The reduced reference context refers to instances where 3D video data 26 is only partially available in that depth maps are provided for both left and right views 26A, 26B, but only a single one of views 26A, 26B is provided. The no reference context refers to instances where 3D video data 26 only includes DIBR-based 3D video data, i.e., video data comprising a single one of the left and right views and a depth map or other depth information.

3D analysis unit 24 then derives one or more distortion metrics 64 ("metrics 64") through quantitative comparison of the ideal depth map 62 to given depth information or depth map 28. 3D analysis unit 24 may derive one or more of metrics 64 as, for example, a standard deviation of the difference between ideal depth map 62 and depth map 28. Alternatively or additionally, 3D analysis unit 24 may derive one or more of metrics 64 as a standard deviation of the change in the difference between ideal depth map 62 and depth map 28 for a first frame of 3D video data 26 and the difference between ideal depth map 62 and depth map 28 and a second frame of 3D video data 26. Alternatively or additionally, 3D analysis unit 24 may derive one or more of metrics 64 as a standard deviation of the difference between depth map 28 computed for a first frame of 3D video data 24 and depth map 28 computed for a second frame of 3D video data 24.

3D analysis unit 24 then computes 3DQM 36 based on derived distortion metrics 64. In some instances, 3D analysis unit 24 generates 3DQM 36 as a mathematical combination of all of distortion metrics 64. In other instances, 3D analysis unit 24 computes 3DQM 36 as a combination of only a subset of distortion metrics 64. Regardless, 3DQM 36 represents an objective metric in that it is not computed as a combination of subjectively derived metrics. Instead, 3D analysis unit 24 computes 3DQM 36 as a combination of objectively derived metrics 64 in that these metrics 64 are derived through a comparison of a given depth map 28 to an estimate of an objective ideal depth map 62. This ideal depth map 62 represents a reference depth map 62 that would produce limited distortion in the image view using DIBR-based video data and therefore provides an objective standard against with which to evaluate the resulting encoded DIBR-based 3D video data 34.

Thus, rather than perform a conventional comparison of depth map 28 to depth map 58' in order to derive a pseudo-3DQM, where depth map 28 may inherently include errors due to depth estimation performed by depth estimation unit 20, objective ideal depth map 62 avoids these inherent errors because 3D analysis unit 24 computes this depth map 62 in a manner that corrects for these inherent errors. Moreover, 3D analysis unit 24 generates 3DQM 36 as a function of metrics 64, which are derived to account for what may be considered perceived visual discomfort in viewing resulting 3D video data 50. In other words, rather than blindly combine some depth metric with traditional 2D metrics to compute a pseudo-3DQM, 3D analysis unit 24 implements the techniques described in this disclosure to compute 3DQM 36 such that it accounts for perceived visual discomfort.

Once 3D analysis unit 24 computes 3DQM 36, 3D analysis unit 24 may transmit 3DQM 36 to each of depth estimation unit 20 and 3D video encoder 22, each of which may then update one or more parameters based on this 3DQM 36 to correct for at least some visual discomfort identified by 3DQM 36. Alternatively, 3D analysis unit 24 may generate a new set of one or more parameters 66, 68 for each of depth estimation unit 20 and 3D video encoder 22 and forward these new parameters 66 and 68 to each of depth estimation unit 20 and 3D video encoder 22. These new parameters 66 and 68 effectively reconfigure depth estimation unit 20 and 3D video encoder 22 to adjust depth estimation and encoding in an attempt to correct the perceived visual discomfort expected when viewing encoded DIBR-based 3D video data 34 identified by 3DQM 36. 3D analysis unit 24 typically performs this entire process concurrently with depth estimation performed by depth estimation unit 20 and encoding performed by 3D video encoder 22 so as to enable dynamic, i.e., real-time or near-real-time, reconfiguration of these units 20, 22 to correct for perceived visual discomfort expected when viewing encoded DIBR-based 3D video data 34.

As noted above, 3D analysis unit 48 likewise computes a 3DQM 60. 3D analysis unit 48 may be substantially similar to 3D analysis unit 24, except that 3D analysis unit 24 may estimate ideal depth map (DM) 70 based on different information. 3D analysis unit 24 still estimates depth map 70 based at least in part on reconstructed right view 50B. However, 3D analysis unit 48 may not and typically does not have access to the original right view 26B as this would defeat the purpose of using a DIBR-based scheme because both views 26A, 26B would be sent eliminating the saving of sending only a single one of these views 26A, 26B and depth information or depth map 28. Consequently, 3D analysis unit 48 generally resides in either the reduced reference or no reference context and determines ideal depth map 70 without access to right view 26B.

In a manner substantially similar to 3D analysis unit 24, 3D analysis unit 48 derives or otherwise computes one or more of distortion metrics 72 based on ideal depth map 70 and reconstructed depth map 58. Again, similar to 3D analysis unit 24, 3D analysis unit 48 computes 3DQM 60 based on metrics 72 and provides this 3DQM 60 to 3D video decoder 44 and view reconstruction unit 46 so that these units 44, 46 may update their respective parameters to account for any perceived viewer discomfort identified by 3DQM 60. Alternatively, 3D analysis unit 48 may determine parameters 74 and 76 based on 3DQM 60 and update 3D video decoder 44 with determined parameters 74 and view reconstruction unit 46 with parameters 76.

These new parameters 74 and 76 effectively reconfigure 3D video decoder 44 and view reconstruction unit 46 to decoding and view reconstruction in an attempt to correct the perceived visual discomfort expected when viewing encoded DIBR-based 3D video data 34 identified by 3DQM 60. 3D analysis unit 48 typically performs this entire process concurrent to decoding performed by 3D video decoder 44 and view reconstruction performed by view reconstruction unit 46 so as to enable dynamic, i.e., real-time or near-real-time, reconfiguration of these units 44, 46 to correct for perceived visual discomfort expected when viewing encoded DIBR-based 3D video data 34. 3D display 42 may then present decoded 3D video data 50 for presentation to one or more viewers of 3D display 42.

In this way, rather than rely on conventional 2D quality metrics computed for both the left and right views and then combining these metrics to form some sort of pseudo-3DQM that ignores depth information, the techniques described in this disclosure formulate a true 3DQM that evaluates distortion with respect to an objective ideal depth map. In DIBR, errors in depth map (for example, due to wrong estimations, numerical rounding and compression artifacts) lead to errors in the relative pixel location and in the magnitude of pixel values of reconstructed view 50B. The visual effect of these errors in reconstructed view 50B is spatially noticeable around texture areas in the form of significant intensity changes and temporally noticeable around flat regions in the form of flickering. Visual discomfort in DIBR-based 3D video may moreover result from several factors including excessive disparities, fast changing disparities, geometric distortions and inconsistencies between various depth cues, such as unmatched object colors. The techniques described in this disclosure objectively quantify the visual quality of DIBR-based 3D video in the form of 3DQMs 36 and 60 so as to potentially dynamically correct for the visual discomfort identified by 3DQMs 36 and 60.

Moreover, the techniques may be implemented in a manner similar to that of rate-distortion compression algorithms. That is, in rate-distortion compression algorithms, compression of video may be increased, e.g., by quantizing residual values, so as to reduce bandwidth consumption over a wireless channel with the trade-off of potentially introducing more artifacts in the decompressed video. In these compression systems, compression may be reduced to reduce the introduction of artifacts into the decompressed video but this may result in larger files that consume more wireless bandwidth. The 3DQM, such as 3DQM 36 or 60, may identify artifacts that are introduced through compression and depth estimation and drive parameter adjustments that result in similar tradeoffs as those described above with respect to rate-constrained compression algorithms. In this sense, the 3DQM may be used to increase compression at the expense of introducing more artifacts or reduce compression at the expense of increased bandwidth consumption.

In this respect, the 3DQM may enable the tailoring of DIBR-based 3D video data generation and compression to suit a particular application. That is, the 3DQM may provide for trade-offs between the complexity of the computation involved in the estimation of accurate depth maps and the artifacts introduced for these images, which is similar rate-distortion trade-offs in compression. By enabling such trade-offs, the 3DQM may facilitate implementation of 3D video data techniques in mobile or embedded real-time applications in which processing or batter resources are limited, such as in mobile devices, such as cellular phones, laptop computers, so-called netbooks, personal digital assistants (PDAs), and the like.

While described above with respect to a two view system, the techniques may be implemented in multi-view 3D systems in which more than two views are provided to a 3D display allowing for multiple different views to be displayed. For example, some 3D displays are able to display multiple views depending on where the viewer is in relation to the 3D display. Viewers to the left of the display may receive a different view than viewers centered with respect to the 3D display or to the left of the 3D display. These 3D displays may concurrently display each of these views, where encoding and decoding of each of these views may proceed using the DIBR processes described in this disclosure. In this respect, the techniques may be employed to provide a 3DQM for each of these views or for the views as a group, where these one or more 3DQM may facilitate the identification and potentially subsequent correction of at least some visual discomfort expected to occur when viewing these views. Thus, while described in this disclosure for ease of illustration purposes with respect to a two-view system, the techniques may be employed in multi-view systems.

Figure 2:
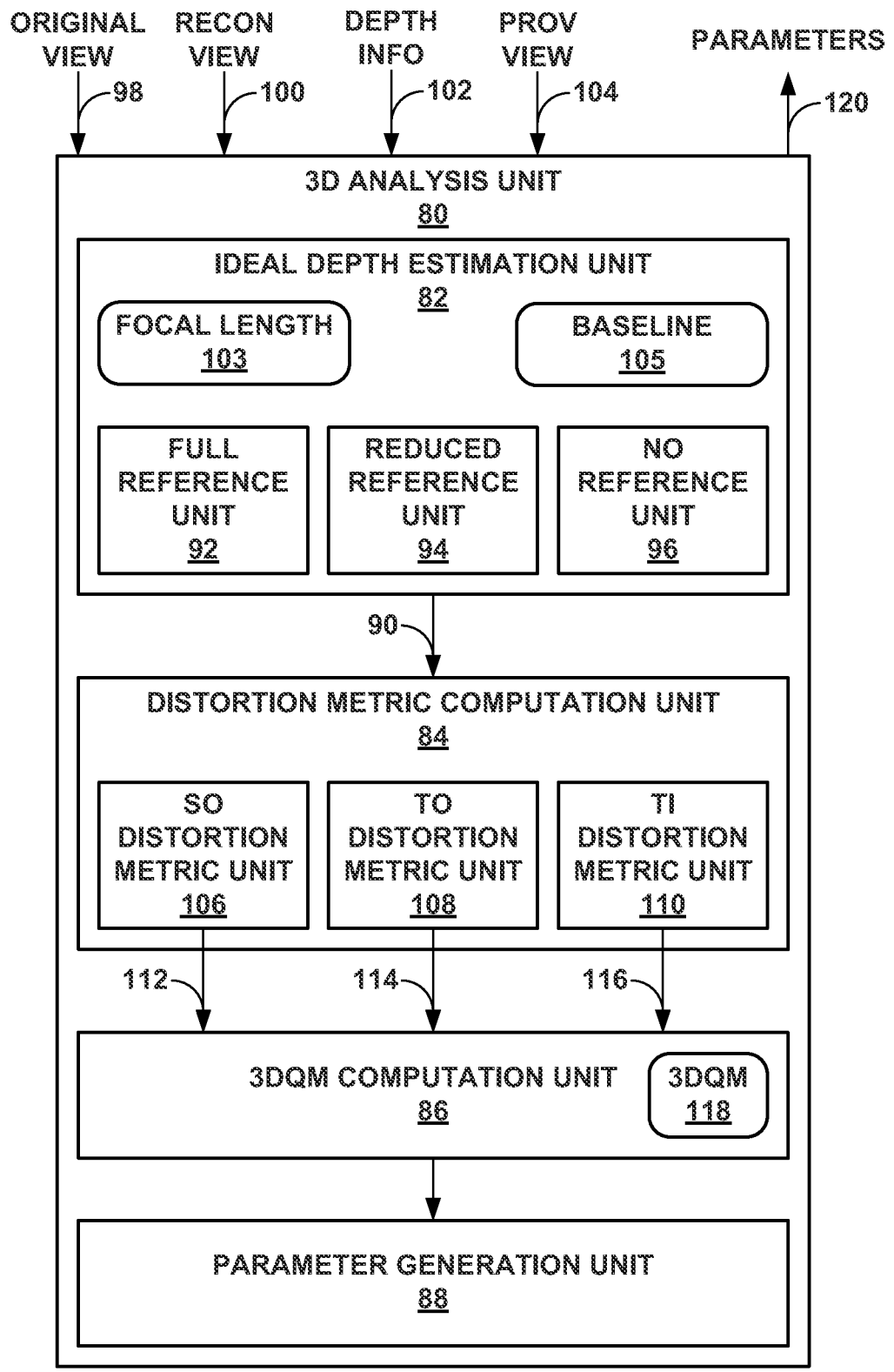
FIG. 2 is a block diagram illustrating an example of a 3D analysis unit that implements various aspects of the techniques described in this disclosure.

FIG. 2 is a block diagram illustrating an example of a 3D analysis unit 80 that implements various aspects of the techniques described in this disclosure. 3D analysis unit 80 may represent either of 3D analysis units 24 or 48 shown in the example of FIG. 1 and various portions of the following discussion of 3D analysis unit 80 may apply to each of 3D analysis units 24 and 48. In some instances, each of 3D analysis units 24 and 48 may be substantially similar to each other such that 3D analysis unit 80 may generally represent both of 3D analysis units 24 and 48. In other instances, 3D analysis unit 24 may be adapted to a particular context, e.g., the above-noted full reference context, such that 3D analysis unit 80 is only partially representative of this adapted 3D analysis unit 24. Likewise, 3D analysis unit 48 may be adapted to a particular context, e.g., the above-noted no reference context, such that 3D analysis unit 80 is only partially representative of this adapted 3D analysis unit 48.

As shown in the example of FIG. 2, 3D analysis unit 80 includes an ideal depth estimation unit 82, a distortion metric computation unit 84 a 3DQM computation unit 86 and a parameter generation unit 88. Each of these units 82-88 may be separately implemented as either hardware or a combination of hardware and software. Alternatively, one or more of units 82-88 may be collectively implemented as either hardware or a combination of hardware and software.

Ideal depth estimation unit 82 generally represents a unit that estimates an ideal depth and outputs an ideal depth map 90. Ideal depth estimation unit 82 includes a number of units 92-96 that estimate ideal depth map 90 based on the availability of different levels of 3D video data. Full reference unit 92 estimates ideal depth map 90 when there is full availability to 3D video data rather than only DIBR-based 3D video data. That is, full reference unit 92 estimates ideal depth map 90 based on an original view 98 and a reconstruction of the original view or reconstructed view 100 ("recon view 100"). Full reference unit 92 also estimates this ideal depth map 90 based on determined depth information 102 ("depth info 102") and 3D capture device parameters, such as a focal length 103 and baseline 105 (which is measures as the straight-line distance between the centers of the 2D cameras of the 3D capture device). Focal length 103 and baseline 105 are described in more detail below with respect to FIG. 7. In some instances, these 3D capture device parameters may reflect parameters of a virtual 3D capture device in that these parameters are not parameters of an actual 3D capture device but merely common parameters representative of those used commonly to model a 3D capture device. Mathematically, the full reference estimation performed by full reference unit 92 may be represented by the following equation (1):

$$Z_{IDEAL} = \frac{\pm FB}{k(I_o - I_g) \pm \frac{FB}{Z}}, \quad (1)$$

where variable $Z_{IDEAL}$ refers to ideal depth map 90 and variable F refers to focal length 103. Variable B in the above equation (1) refers to baseline 105, variable k refers to a constant value, variable $I_o$ refers to original view or image 98, variable $I_g$ refers to generated or reconstructed view or image 100 and variable Z refers to depth map of depth information 102. Reference to views or images in this disclosure refers to the actual pixel values that form each view or image. The computed ideal depth map is calculated as a two-dimensional array of grayscale values.

Reduced reference unit 94 also estimates ideal depth map 90, but in a different reduced reference context when there is reduced or partial availability of 3D video data. That is, reduced reference unit 94 estimates ideal depth map 90 based on a provided view 104 and reconstructed view 100. Reduced reference unit 94 also estimates this ideal depth map 90 based on determined depth information 102 and 3D capture device parameters, focal length 103 and baseline 105. With regard to depth information 102, reduced reference unit 94 generally requires both a depth map for the left view and the depth map for the right view. A depth estimation unit, such as depth estimation unit 20, is generally capable of providing both of these depth maps corresponding to each of the left and right views and depth information 28 shown in the example of FIG. 1 may include both of these depth maps. Depth coding unit 32 may encode both of these depth maps and transmit these as encoded DIBR-based 3D video data 34. Mathematically, the reduced reference estimation performed by reduced reference unit 94 may be represented by the following equation (2):

$$Z_{IDEAL} = \frac{\pm FB}{k(I_R - I_g) \pm FB\left(\frac{1}{Z_L} + \frac{1}{Z_R}\right) + h}, \quad (2)$$

where variable $Z_{IDEAL}$ refers to ideal depth map 90 and variable F refers to focal length 103. Variable B in the above equation (2) refers to baseline 105, variable k refers to a constant value, variable h refers to the shift in the horizontal direction of the center of projection with respect to the center of the sensor, according to the shift-sensor camera model described below in more detail with respect to FIG. 7. variable $I_R$ refers to a reference or provided view or image 104 ("prov view 104"), variable $I_g$ refers to generated or reconstructed view or image 100 and variable $Z_L$ refers to a left depth map of depth information 102 and $Z_R$ refers to a right depth map of depth information 102.

No reference unit 96 represents yet another unit that estimates ideal depth map 90, but in yet another context referred to as a "no reference" context where when there is only DIBR-based 3D video data. That is, no reference unit 96 estimates ideal depth map 90 based on a provided view 104 and a reconstructed view 100. Reduced reference unit 94 also estimates this ideal depth map 90 based on depth information 102 and 3D capture device parameters, focal length 103 and baseline 105. Mathematically, the no reference estimation performed by reduced reference unit 94 may be represented by the following equation (3):

$$Z_{IDEAL} \approx \frac{\pm FB}{f(I_R, I_g) \pm \frac{FB}{Z}}, \quad (3)$$

where variable $Z_{IDEAL}$ refers to ideal depth map 90 and variable F refers to focal length 103. Variable B in the above equation (3) refers to baseline 105, variable $I_R$ refers to a reference or provided view or image 104 ("prov view 104"), variable $I_g$ refers to generated or reconstructed view or image 100 and variable Z refers to a depth map of depth information 102. Function $f$ in equation (3) refers to a function that calculates a mean disparity (d) between corresponding blocks of $I_R$ and $I_g$ and applies a shift by value d to the corresponding block in $I_R$. Function $f$ then outputs the intensity difference between the shifted $I_R$ and the generated view $I_g$.

Distortion metric computation unit 84 represents a unit that computes distortion metrics based on ideal depth map estimate 90. More specifically, distortion metric computation unit 84 may compute distortion metrics as a quantitative measure of the difference between depth maps of depth information 102 and ideal depth map estimate 90. While the difference between depth information 102 and ideal depth map estimate 90 does not always identify visual discomfort, an inconsistent error in depth does cause visual discomfort. For this reason, a number of the distortion metrics measure inconsistencies rather than errors, as consistent errors may not result in visual discomfort.

For example, in the spatial domain, a consistent (or uniform) error over a specific depth plane causes the entire plane to be shifted in one direction and the perceptual effect of such error will be a slight increase or decrease in the perceived depth, which generally does not provide much visual discomfort. An inconsistent error in depth, however, results in dislocated color pixel/blocks that generate visual discomfort in the form of inconsistencies in depth cues due to unmatched object colors.

Consequently, distortion metric computation unit 84 computes distortion metrics that evaluate inconsistencies rather than simply identify errors. In comparing ideal depth estimate 90 to one or more distortion metrics, such as distortion metrics 112-116 described below, distortion metric computation unit 84 captures errors caused by depth map estimation and compression, as well as, errors caused by processing of the synthesized or generated colored video itself due to, for example, hole-filling algorithms and video compression processes. Errors caused by processing of the generated colored video are identified because ideal depth map estimate 90 is generated as a function of the given depth and the colored video itself.

Distortion metric computation unit 84 includes a spatial error outliers (SO) distortion metric unit 106 ("SO distortion metric unit 106"), a temporal error outliers (TO) distortion metric unit 108 ("TO distortion metric unit 108"), and a temporal inconsistency (TI) distortion metric unit 110 ("TI distortion metric unit 110"). SO distortion metric unit 106 represents a unit that computes an SO distortion metric 112 based on ideal depth map estimate 90. In particular, SO distortion metric unit 106 computes SO distortion metric 112 as a standard deviation of the difference between a given depth map of depth information 102 and ideal depth map estimate 90, which may expressed mathematically by the following equation (4):

$$SO = std(\Delta Z) \quad (4)$$

where the variable SO refers to SO distortion metric 112, and $std(\Delta Z)$ refers to the standard deviation of the difference between a depth map of depth information 102 and ideal depth map estimate 90. SO distortion metric unit 106 effectively quantifies spatial inconsistencies for a given image or frame of 3D video data.

SO distortion metric 112 generally captures both the noise caused by preprocessing and also inaccuracies in a wrapping process used to generate 3D video data. Wrapping generally refers to wrapping a 2D image around a 3D volume, such as a polygon. Wrapping may involve inherent approximations as well as camera modeling approximations. The disparity of synthesized or reconstructed images without any processing depth are not exactly the same as the disparity of an ideally acquired image from the camera. Hence, the shifts in the different depth planes is not going to match perfectly. To separate these errors in the difference between the depth map and the ideal depth map estimate from the errors due to processing, a standard deviation of this difference is used to calculate the outliers. These outliers are the noise caused by depth map processing plus the edges due to improper plane shifts. In this way, SO identifies the outliers caused by depth map processing and improper plane shifts.

TO distortion metric unit 108 represents a unit that computes a TO distortion metric 114 based on ideal depth map estimate 90. In particular, TO distortion metric unit 108 computes TO distortion metric 114 as a standard deviation of the difference between a given depth map of depth information 102 for a given frame of 3D video data and ideal depth map estimate 90 for the same frame subtracted from the difference between a given depth map of depth information 102 for a subsequent frame of 3D video data and ideal depth map estimate 9 for the same subsequent frame, which may expressed mathematically by the following equation (5):

$$TO = std(\Delta Z_{t+1} - \Delta Z_t). \quad (5)$$

The variable TO in the above equation (5) refers to TO distortion metric 114, and $std(\Delta Z_{t+1} - \Delta Z_t)$ refers to the standard deviation of the difference between a given depth map of depth information 102 for a given frame (t) of 3D video data and ideal depth map estimate 90 for the same frame subtracted from the difference between a given depth map of depth information 102 for a subsequent frame (t+1) of 3D video data and ideal depth map estimate 9 for the same subsequent frame.

TO distortion metric unit 106 effectively quantifies temporal inconsistencies, which may be spatially noticeable around textured areas in the form of significant intensity changes and around flat regions in the form of flickering. The reasoning behind TO is that the error introduced by noise is inconsistent temporally while the edge will be temporally consistence since the same wrapping process generates both frames. In this respect, TO distortion metric 114 filters out the edges in SO and keeps only the noise contributions.

Fast changing disparities or inconsistencies are another source of visual discomfort and are mainly caused by errors in depth estimation and hole-filling algorithms, or compression. These inconsistencies may be identified by TI distortion metric 116, where TI distortion metric unit 110 represents a unit that computes this TI distortion metric 116. TI distortion metric unit 110 may compute TI distortion metric 116 in accordance with the following equation (6):

$$TI = std(Z_{t+1} - Z_t), \quad (6)$$

where the variable TI refers to TI distortion metric 116 and $std(Z_{t+1} - Z_t)$ refers to the standard deviation of the difference between depth information 102 for a given frame (t) of 3D video data and depth information 102 for a subsequent frame (t+1) of the 3D video data. While a number of exemplary distortion metrics 112-116 have been described above, the techniques described in this disclosure should not be limited to these exemplary distortion metrics 112-116 but may include any other type of distortion metric for evaluating expected visual discomfort of 3D video data.

3DQM computation unit 86 represents a unit that computes 3DQM 118 based on one or more of distortion metrics, such as distortion metrics 112-116. 3DQM computation unit 86 may normalize or otherwise adjust distortion metrics 112-116 prior to combining distortion metrics 112-116 to form 3DQM 118. 3DQM computation unit 86 may compute 3DQM 118 in accordance with the following exemplary equation (7):

$$3DQM = K(1 - SO(SO \cap TO))^a (1 - TI)^b (1 - TO)^c. \quad (7)$$

In the above equation (7), the variable 3DQM refers to 3DQM 118, the variable SO refers to SO distortion metric 112, the variable TO refers to TO distortion metric 114, the variable TI refers to TI distortion metric 116, the variable K refers to a constant to scale the final 3DQM metric within the range [1-5] to map onto the MOS (Mean Opinion Score) range, and the variables a, b and c represent constant values determined by training sequences. In effect, 3DQM computation unit 86 generates 3DQM 118 to identify at least some visual discomfort expected to be experienced by a viewer when viewing the 3D video data for which this 3DQM 118 is determined.

Parameter generation unit 88 represents a unit that generates parameters 120 based on 3DQM 118. Parameter generation unit 88 generates parameters 120 to correct for at least some visual discomfort identified by 3DQM 118. Parameter generation unit 88 may determines parameters 120 that update any of a depth estimation unit, such as depth estimation unit 20, a 3D video encoder, such as 3D video encoder 22, a 3D video decoder, such as 3D video decoder 44, and a view reconstruction unit, such as view reconstruction unit 46, depending on the context in which 3D analysis unit 80 operates.

For example, 3D analysis unit 80 may operate within a source device that originates 3D video data, such as source device 12. Assuming that 3D analysis unit 80 represents 3D analysis unit 24 for purposes of illustration, 3D analysis unit 80 receives full 3D video data 26 that includes both left view 26A and right view 26B. 3D analysis unit 80 also is preconfigured with standard or receives focal length 103 and baseline 105. In addition, 3D analysis unit 80 receives reconstructed right view 100 in the form of reconstructed right view 50B' from depth estimation unit 20. 3D analysis unit 80 further receives depth information 102 in the form of depth information 28, which may comprise a left depth map corresponding to left view 26A and a right depth map corresponding to right view 26B.

Based on this received information, ideal depth estimation unit 82 of 3D analysis unit 80 invokes full reference unit 92 considering that 3D analysis unit 80 received both of left and right views 26A, 26B and depth information 28 comprising both a left and right depth maps. Once invoked, full reference unit 92 then computes ideal depth map estimate 90, which in the context of source device 12 of FIG. 1 represents ideal depth map 62, in accordance with equation (1) listed above. Full reference unit 92 outputs ideal depth map 62 to distortion metric computation unit 84.

Upon receiving ideal depth map 62, distortion metric computation unit 84 invokes each of SO distortion metric unit 106, TO distortion metric unit 108 and TI distortion metric unit 110 to compute respective ones of distortion metric 112-116 in accordance with corresponding equations (3)-(6). In the context of source device 12 of FIG. 1, distortion metrics 112-116 represent metrics 64. Units 106-110 output distortion metrics 64 to 3DQM computation unit 86. 3DQM computation unit 86 computes 3DQM 118, which in the context of source device 12 of FIG. 1 represents 3DQM 36. 3DQM computation unit 86 then outputs 3DQM 36 to parameter generation unit 88, which outputs parameters 120 that, in the context of source device 12 of FIG. 1, include parameters 66, 68.

While described with respect to a full reference context, 3D analysis unit 80 may also be implemented within a source device that does not capture or otherwise originate the 3D video data or content but that merely stores the 3D video data. This stored 3D video data may only include depth maps corresponding to the left and right views and a single one of views 26A, 26B. In this so-called "half reference" context, rather than invoke full reference unit 92 to compute ideal depth map 90, ideal depth estimation unit 84 invokes reduced or half reference unit 94 to compute ideal depth map 90, which again in the context of source device 12 of FIG. 1, represents ideal depth map 62. In all other respect, however, 3D analysis unit 80 operates substantially similar to that described above with respect to the full reference instance.

As another example, 3D analysis unit 80 may operate within a display device that originates 3D video data, such as display device 14. Assuming that 3D analysis unit 80 represents 3D analysis unit 48 for purposes of illustration, 3D analysis unit 80 receives DIBR-based 3D video data 50 that includes provided left view 50A and reconstructed right view 50B. 3D analysis unit 80 also receives focal length 103 and baseline 105. 3D analysis unit 80 further receives depth information 102 in the form of depth information 58, which may comprise a left depth map corresponding to provided left view 50A.

Based on this received information, ideal depth estimation unit 82 of 3D analysis unit 80 invokes no reference unit 96 considering that 3D analysis unit 80 received only a single provided view 50 and a corresponding left depth map in the form of depth information 58. Once invoked, no reference unit 96 computes ideal depth map estimate 90, which in the context of display device 14 of FIG. 1 represents ideal depth map 70, in accordance with equation (3) listed above. Full reference unit 92 outputs ideal depth map 62 to distortion metric computation unit 84.

Upon receiving ideal depth map 62, distortion metric computation unit 84 invokes each of SO distortion metric unit 106, TO distortion metric unit 108 and TI distortion metric unit 110 to compute respective ones of distortion metric 112-116 in accordance with corresponding equations (4)-(6). In the context of display device 14 of FIG. 1, distortion metrics 112-116 represent metrics 72. Units 106-110 output distortion metrics 72 to 3DQM computation unit 86. 3DQM computation unit 86 computes 3DQM 118, which in the context of display device 14 of FIG. 1 represents 3DQM 60. 3DQM computation unit 86 then outputs 3DQM 60 to parameter generation unit 88, which outputs parameters 120 that, in the context of display device 14 of FIG. 1, include parameters 74, 76.

While described with respect to a full reference context, 3D analysis unit 80 may also be implemented within a display device that receives DIBR-based 3D video data that includes both a right and left depth map in the form of depth information 102. In this so-called "half reference" context, rather than invoke no reference unit 96 to compute ideal depth map 90, ideal depth estimation unit 84 invokes reduced or half reference unit 94 to compute ideal depth map 90, which again in the context of display device 12 of FIG. 1, represents ideal depth map 70. In all other respect, however, 3D analysis unit 80 may operate substantially similar to that described above with respect to the full and no reference instances.

Figure 3:
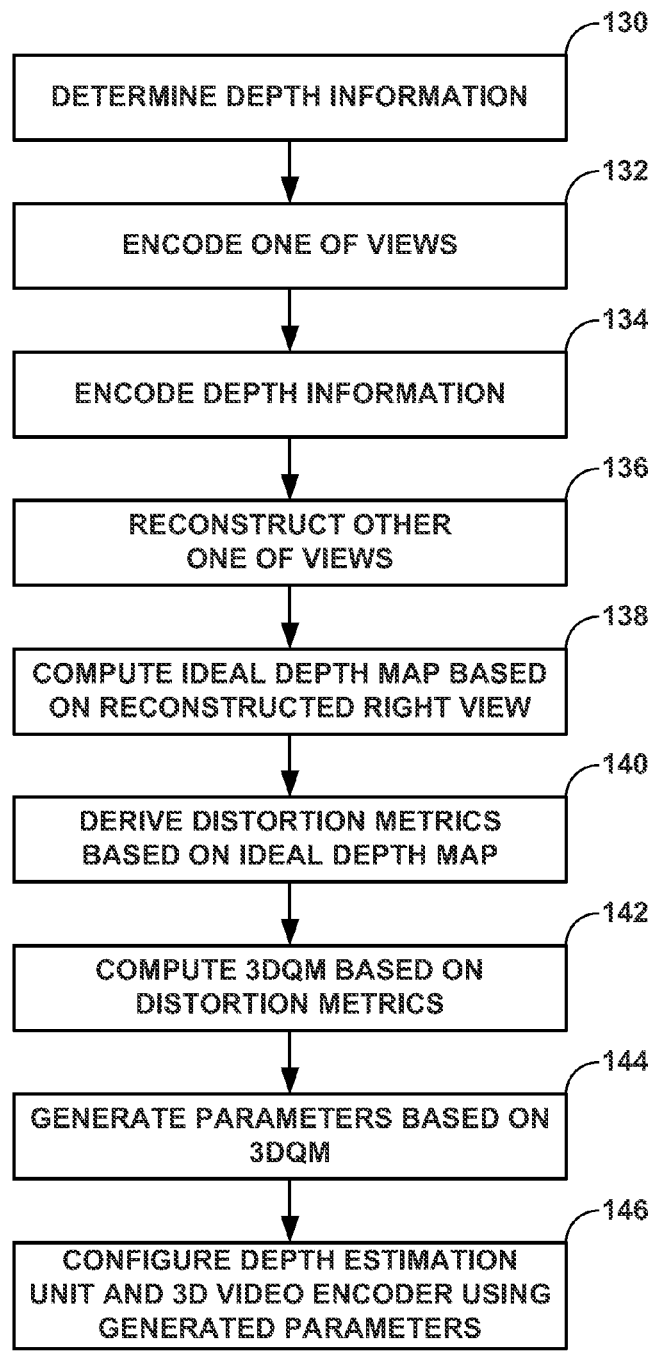
FIG. 3 is a flowchart illustrating exemplary operation of a source device in implementing various aspects of the three-dimensional (3D) quality metric derivation techniques described in this disclosure.

FIG. 3 is a flowchart illustrating exemplary operation of a source device, such as source device 12 shown in the example of FIG. 1, in implementing various aspects of the three-dimensional (3D) quality metric derivation techniques described in this disclosure. While described with respect to a source 12 of FIG. 1, the techniques may be implemented by any device capable of encoding 3D video data to produce encoded DIBR-based 3D video data.

Initially, control unit 16 of source device 12 invokes depth estimation unit 20 to compute depth information 28 in the manner described above (130). 3D video encoder 22 invokes view coding unit 30 to encodes one of views 26A, 26B (132), where it is assumed for purposes of illustration that view coding unit 30 encodes left view 26A. 3D video encoder 22 also invokes depth coding unit 32 to encode depth information 28 (134). 3D video encoder 22 outputs encoded DIBR-based 3D video data 34.

3D video encoder 22 also invokes view coding unit 30 to decode the encoded left view, outputting decoded left view 50A'. This decoding is a routine aspect of video encoding as video encoding decodes the encoded view for purposes of determining residual data, which is the difference between decoded left view 50A' and a subsequent left view. Similarly, depth coding unit 32 decodes the encoded depth information to produce decoded depth information 58'. Depth coding unit 32 outputs decoded depth information 58' to depth estimation unit 20.

Based on decoded left view 50A' and decoded depth information 58', depth estimation unit 20 reconstructs the other one of views 26A, 26B, which is shown as reconstructed right view 50B' in the example of FIG. 1 (136). 3D analysis unit 24 computes ideal depth map 62 based on at least on reconstructed right view 50B', as described above (138). 3D analysis unit 24 then derives distortion metrics 64 based on ideal depth map 62 in the manner described above (140). Also as described above, 3D analysis unit 24 computes 3DQM 36 based on distortion metrics 64 (142). In addition, 3D analysis unit 24 generates parameters 66, 68 based on 3DQM 36 (144). 3D analysis unit 24 generates parameters 66, 68 so as to correct for at least some of the identified visual discomfort expected when viewing 3D video data 26. Using these parameters 66, 68, 3D analysis unit 24 configures depth estimation unit 20 and depth coding unit 32 (146).

Figure 4:
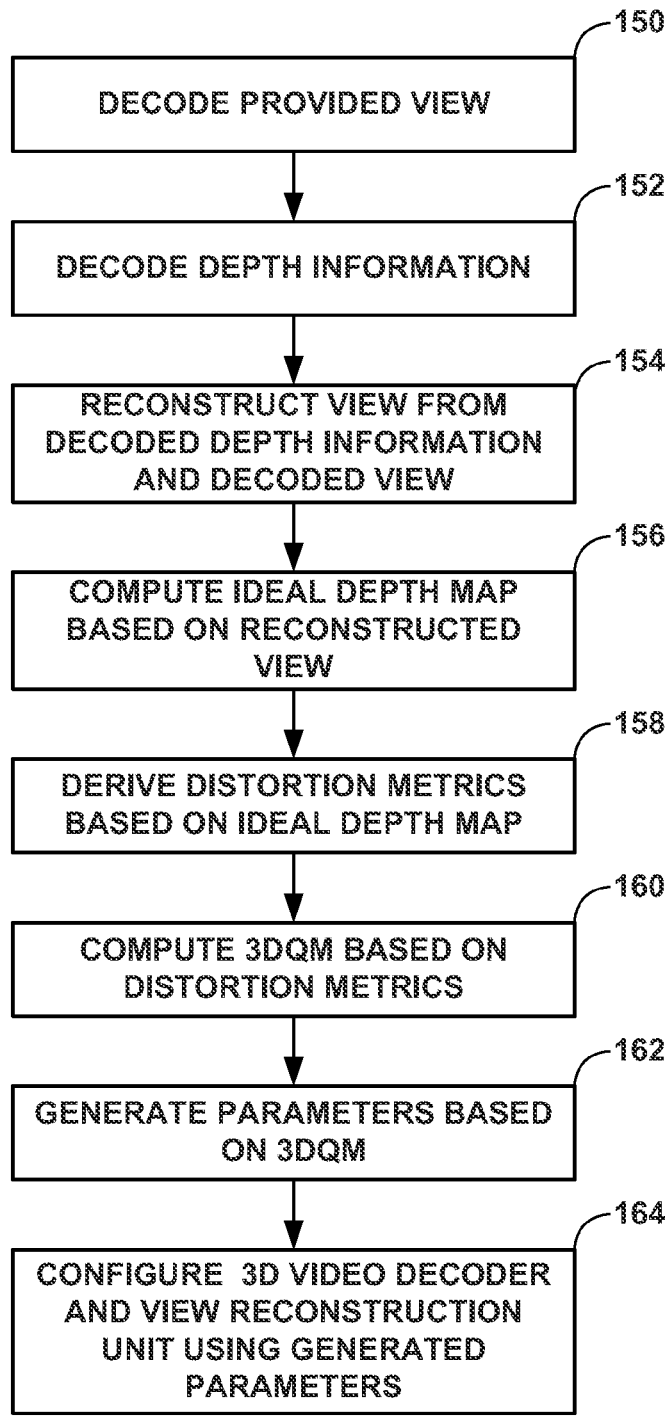
FIG. 4 is a flowchart illustrating exemplary operation of a display device in implementing various aspects of the techniques described in this disclosure.

FIG. 4 is a flowchart illustrating exemplary operation of a display device, such as display device 14 shown in the example of FIG. 1, in implementing various aspects of the techniques described in this disclosure. While described with respect to a display device 14 of FIG. 1, the techniques may be implemented by any device capable of decoding encoded DIBR-based 3D video data to produce DIBR-based 3D video data.

Initially, control unit 38 of display device 14 invokes 3D video decoder 44 to decoded encoded DIBR-based 3D video data 34. Encoded DIBR-based 3D video data 34 includes an encoded provided view and encoded depth information. 3D video decoder 44 invokes view decoding unit 54 to decode the provided view, generating provided view 50A (150). 3D video decoder 44 also invokes depth decoding unit 56 to decode the encoded depth information, generating decoded depth information 58 (152). Control unit 38 then invokes view reconstruction unit 46, which reconstructs reconstructed view 50B from decoded depth information 58 and decoded provided view 50A (154).

Control unit 38 further invokes 3D analysis unit 48 after reconstructive view 50B. 3D analysis unit 48 computes ideal depth map 70 based at least on reconstructed view 50B in the manner described above (156). 3D analysis unit 48 then derives distortion metrics 72 based on ideal depth map 70, as described above (158). Also, as described above, 3D analysis unit 48 computes 3DQM 60 based on distortion metrics 72 (160). 3D analysis unit 48 further generates parameters 74, 76 based on 3DQM 60 (162). 3D analysis unit 24 generates parameters 74, 76 so as to correct for at least some of the identified visual discomfort expected when viewing 3D video data 50. Using these generated parameters 74, 76, 3D analysis module 48 configures 3D video decoder 44 and view reconstruction unit 46 (164).

Figure 5:
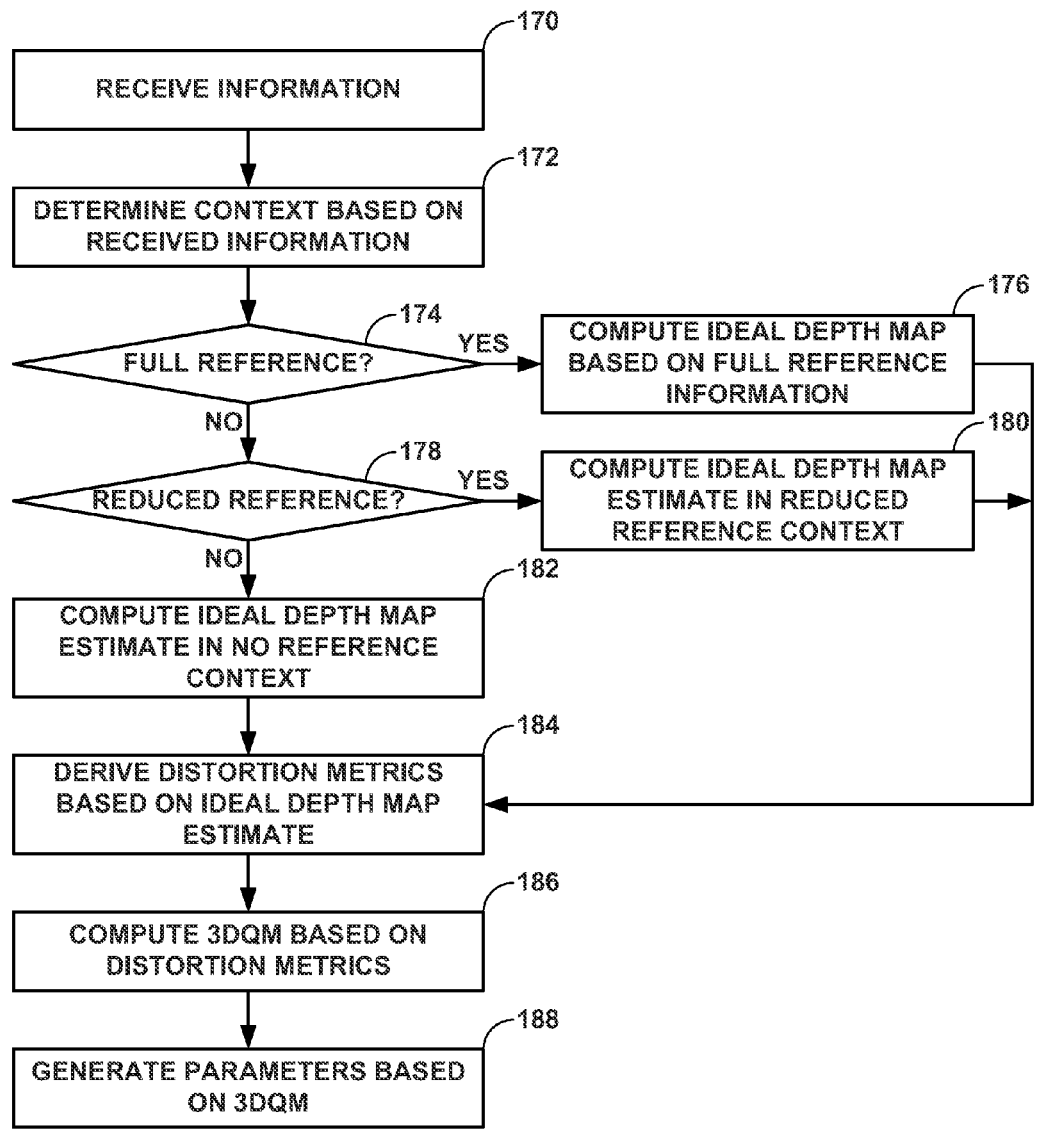
FIG. 5 is a flowchart illustrating exemplary operation of a 3D analysis unit in implementing various aspects of the techniques described in this disclosure to compute a 3D quality metric.

FIG. 5 is a flowchart illustrating exemplary operation of a 3D analysis unit, such as 3D analysis unit 80 shown in the example of FIG. 2, in implementing various aspects of the techniques described in this disclosure to compute a 3D quality metric. Initially, 3D analysis unit 80 receives information in the form of reconstructed view 100 and depth information 102 and one or more of original view 98 and a provided view 104 (170). 3D analysis unit 80 invokes ideal depth estimation unit 82 in response to receiving this information. Ideal depth estimation unit 82 then determines a context based on the received information (172).

For example, assuming ideal depth estimation unit 82 receives original view 98, reconstructed view 100 and depth information 102 that includes depth maps for both of the views, ideal depth estimation unit 82 determines that the context in which 3D analysis unit 80 operates is the full reference context. The received information may therefore be characterized as full reference information. Upon determining this full reference context ("YES 174"), ideal depth estimation unit 82 invokes full reference unit 92. Full reference unit 92 implements equation (1) listed above to compute ideal depth map 90 based on the determined full reference information (176).

As another example, assuming ideal depth estimation unit 82 only receives reconstructed view 100, provided view 104 and depth maps for both the left and right views, ideal depth estimation unit 82 determines that the context in which 3D analysis unit 80 operates is the reduced reference context. The received information may therefore be characterized as reduced reference information. Ideal depth estimation unit 82 then determines that 3D analysis unit 80 does not operate in the full reference context ("NO" 174) but in the reduced reference context ("YES" 178). In response to this determination, ideal depth estimation unit 82 invokes reduced reference unit 94. Reduced reference unit 94 implements equation (2) listed above to compute ideal depth map estimate 90 based on the reduced reference information (180).

As yet another example, assuming ideal depth estimation unit 82 only receives reconstructed view 100, provided view 104 and depth maps for one of the left and right views, ideal depth estimation unit 82 determines that the context in which 3D analysis unit 80 operates is the no reference context. The received information may therefore be characterized as no reference information. Ideal depth estimation unit 82 then determines that 3D analysis unit 80 does not operate in either the full reference context ("NO" 174) or the reduced reference context ("NO" 178). As a result, ideal depth estimation unit 82 invokes no reference unit 96. No reference unit 96 implements equation (3) listed above to compute ideal depth map estimate 90 based on the no reference information (182).

Regardless, ideal depth estimation unit 82 outputs ideal depth map estimate 90 to distortion metric computation unit 84. In response to receiving this ideal depth estimation unit 82, distortion metric computation unit 84 invokes metric units 106-110. Metric units 106-110 then compute metrics 112-116 based on ideal depth map estimate 90 in accordance with corresponding equations (4)-(6) listed above (184). Depth metric computation unit 84 outputs these metrics 112-116 to 3DQM computation unit 86. In response to receiving these metrics 112-116, 3DQM computation unit 86 computes 3DQM 118 based on distortion metrics 112-116 in accordance with equation (7) listed above (186). 3D computation unit 86 outputs 3DQM 118 to parameter generation unit 88. In response to receiving 3DQM 118, parameter generation unit 88 generates parameters 120 based on 3DQM 118 (188).

Figure 6:
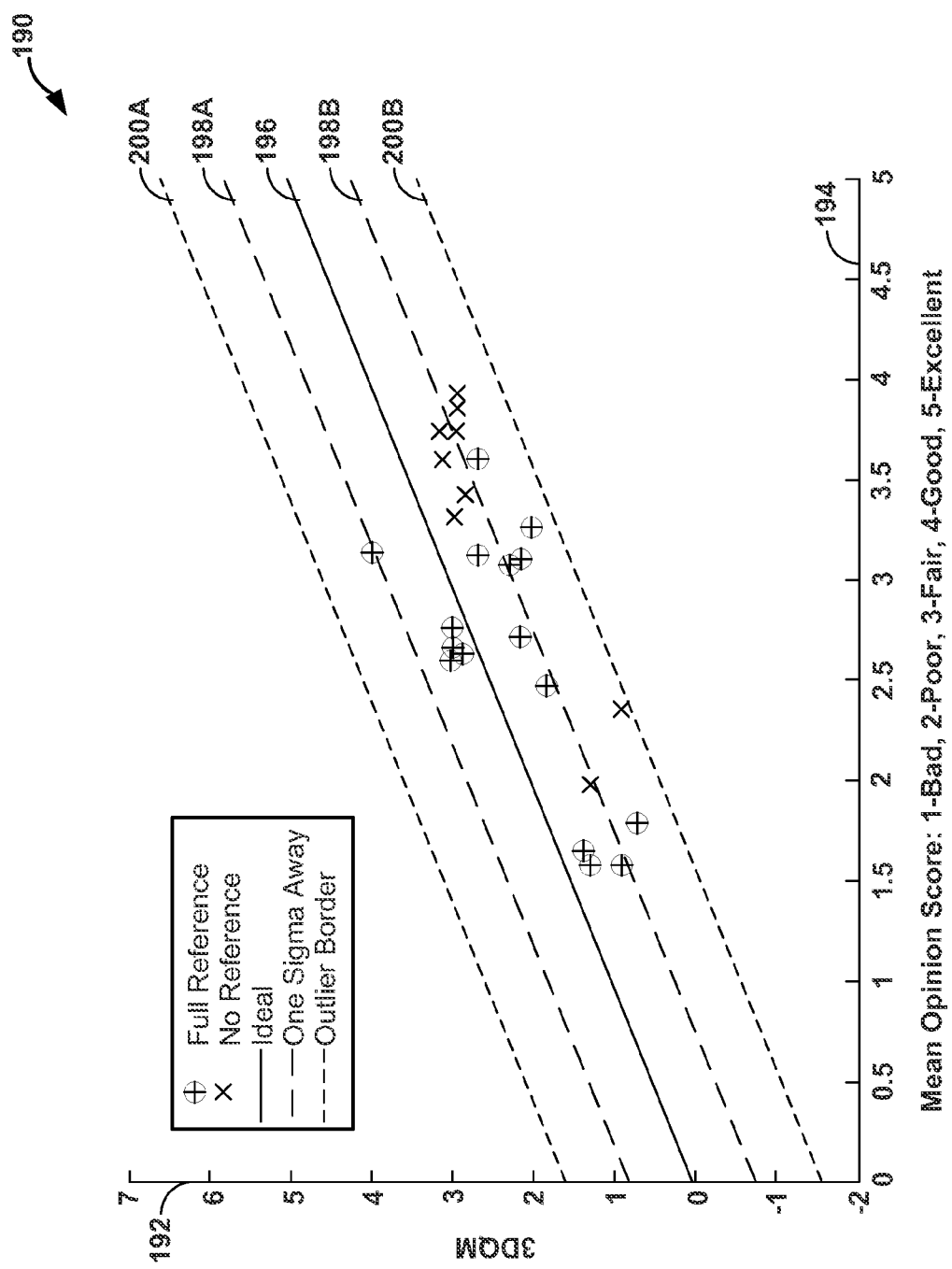
FIG. 6 is a diagram illustrating a graph that provides a subjective analysis of the 3DQM produced in accordance with the techniques described in this disclosure.

FIG. 6 is a diagram illustrating a graph 190 that provides a subjective analysis of the 3DQM produced in accordance with the techniques described in this disclosure. Graph 190 includes a y-axis 192 that defines possible values for a 3DQM, such as 3DQMs 36, 60 of FIG. 1 and 3DQM 118 of FIG. 2. Graph 190 also includes an x-axis 194 that defines mean opinion scores, where a score of one represents a bad evaluation, a score of two represents a poor evaluation, a score of three represents a fair evaluation, a score of four represents a good evaluation and a score of five represents an excellent evaluation.

Graph 190 also includes a first line 196 shown as a solid line in graph 190. this line 196 identifies an ideal value for 3DQM for the same 3D video data that was evaluated by viewers for which the mean opinion score was generated. Notably, line 196 indicates that a 3DQM score of zero corresponds to a mean opinion score of 0 and proceeds linearly in this manner such that a 3DQM score of one corresponds to a mean opinion score of 1 and so on. Graph 190 further provides for a set of dashed lines 198A, 198B that identify one sigma of standard deviation (positive and minus) away from ideal line 196. Furthermore, graph 190 includes a second set of lines 200A, 200B that defines an outlier border from ideal line 196.

Graph 190 also features a number of data points for a 3DQM calculated in both a full reference context and a no reference context. Both the full reference 3DQM and the no reference 3DQM generally reside within one standard deviation (as identified by lines 198A, 198B) of ideal line 196. Specifically, the root mean square (RMS) error of the results equals approximately 0.6158 and the standard deviation of mean opinion score is approximately 0.7885. Considering that the root mean square error is less than the standard deviation of mean opinion score, it can generally be concluded that 3DQM is very accurate. The correlation coefficient for the full and no reference 3DQM equals approximately 0.8942, indicating that the results are coherent, while the outlier ratio is zero indicating that all 3DQM values are consistent. In this regard, the 3DQM may approximate subjective viewer results and therefore may facilitate automatic correction of 3D video data to improve or at least facilitate the viewing experience of 3D video data.

Objective quality metrics for 3DTV, such as the 3DQM described above, may be of great importance for advances in the quality of DIBR algorithms, depth map compression, depth map estimations, hole-filling techniques, and display enhancements. Ideal depth map estimation, which is particular to 3DQM, may also be significant as it can be used as a refinement step for the bad pixel correction in depth map estimation in the manner described above. In particular, quantifying how depth estimation inaccuracies affect the visual quality of particular images may allow for trade-offs between the complexity of the computation involved in the estimation of accurate depth maps and the artifacts introduced for these images, which is similar to rate-distortion trade-offs in compression. This trade-off aspect may be especially applicable in embedded real-time applications where processing or battery resources are limited. Implementation of the 3DQM techniques may also allow for actual calculation of the perceptual distortion due to depth map artifacts that allows more efficient rate-distortion criteria for the allocation of bits in depth map compression as compared to error based metrics.

Again, while described above with respect to a two view system, the techniques may be implemented in multi-view 3D systems in which more than two views are provided to a 3D display allowing for multiple different views to be displayed. In this respect, the techniques may be employed to provide a 3DQM for each of these views or for the views as a group, where these one or more 3DQM may facilitate the identification and potentially subsequent correction of at least some visual discomfort expected to occur when viewing these views. Thus, while described in this disclosure for ease of illustration purposes with respect to a two-view system, the techniques may be employed in multi-view systems.

Figure 7:
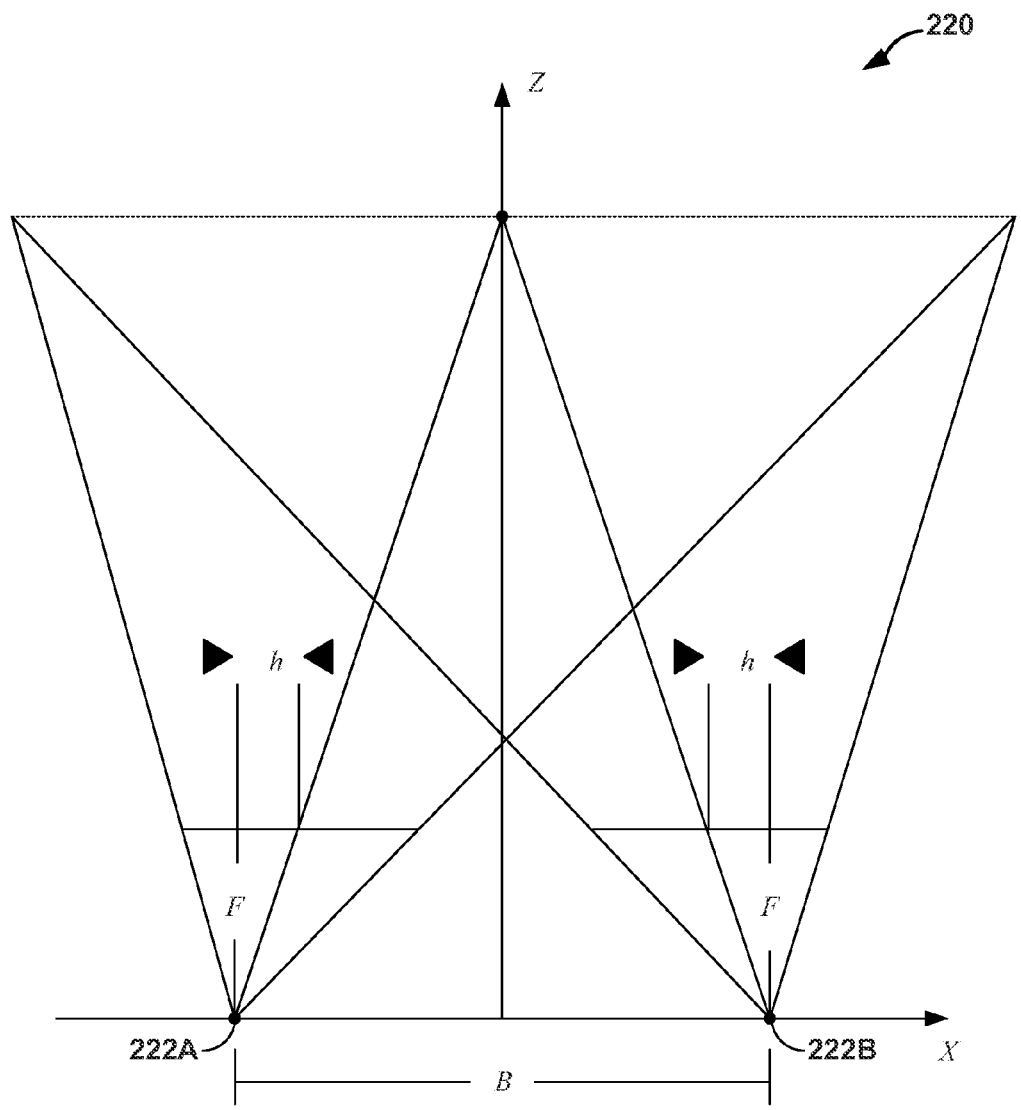
FIG. 7 is a diagram showing a shift-sensor camera model.

FIG. 7 is a diagram 220 showing a shift-sensor camera model. The shift-sensor camera model may effectively model a 3D capture device and, for this reason, may represent a virtual 3D capture device. In diagram 220, point 222A, 222B represent the center point of a left-eye 2D capture device and a right-eye 2D capture device, respectively. The horizontal distance between these points 222A, 222B is, as noted above, referred to as a baseline, which is denoted by the letter 'B.' The distance from each of the centers to the focal point, which again is referred to as the focal length, is shown in diagram 220 as the letter 'F.' The letter 'h' in diagram 220 refers to the shift in the horizontal direction of the center of projection with respect to the center of the sensor. These various letters 'B,' 'F,' and 'h' refer to variables of the shift-sensor camera model that may be altered in response to different 3DQM values to correct for at least some expected visual discomfort. These variables also correspond to those used above in the various ones of the equations, such as equations (2) and (3).

The techniques described herein may be implemented in hardware, firmware, or any combination thereof. The hardware may, in some instances, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples of the disclosure have been described. These and other examples are within the scope of the following claims.

The invention claimed is:

1. A method for obtaining an objective metric to quantify the visual quality of depth-image-based rendering (DIBR)-based three-dimensional (3D) video data, the method comprising:

estimating an ideal depth map that would generate a distortion limited image view using DIBR-based 3D video data based on a combination of a view generated from the DIBR-based 3D video data, a focal length of a virtual 3D image capture device, and a baseline of the virtual 3D capture device;

deriving distortion metrics comprising a spatial error outliers distortion metric that is based on a difference between an ideal depth map and the depth map of the DIBR-based 3D video data, a temporal error outliers distortion metric that is based on a difference between the ideal depth map and the depth map of the DIBR-based 3D video data for at least two consecutive frames of the 3D video, and a temporal inconsistency distortion metric that is based on a difference between depth maps used to generate DIBR-based 3D video data and a successive DIBR-based 3D video data; and computing the objective metric to quantify visual quality of the DIBR-based 3D video data based on the derived distortion metrics comprising the spatial error outliers distortion metric, the temporal error outliers distortion metric, and the temporal inconsistency distortion metric.

2. The method of claim 1, wherein each of the distortion metrics indicates a measurement of 3D viewing visual discomfort expected when viewing the DIBR-based 3D video data.

3. The method of claim 1, wherein estimating the ideal depth map includes estimating the ideal depth map in accordance with the following equation:

$$Z_{IDEAL} = \frac{\pm FB}{k(I_o - I_g) \pm \frac{FB}{Z}},$$

wherein Ig represents a view generated from the DIBR-based 3D video data, Io represents an original image, Z represents the depth map of the DIBR-based 3D video data, F represents a focal length of a virtual 3D capture device used to generate a different view from the DIBR-based 3D video data, and B represents a baseline of the virtual 3D capture device used to generate a different view from the DIBR-based 3D video data.

4. The method of claim 1, wherein estimating the ideal depth map includes estimating the ideal depth map in accordance with the following equation:

$$Z_{IDEAL} = \frac{\pm FB}{k(I_R - I_g) \pm FB\left(\frac{1}{Z_L} + \frac{1}{Z_R}\right) + h},$$

wherein $I_R$ represents a reference view, Ig represents a view generated from the DIBR-based 3D video data, $Z_L$ represents a depth map of the DIBR-based 3D video data from an original left eye view, $Z_R$ represents a depth map of the DIBR-based 3D video data from an original right eye view, k represents a first constant, h represents a second constant, F represents a focal length of the virtual 3D image capture device used to generate an additional view from the DIBR-based 3D video data, and B represents a baseline of the virtual 3D image capture device used to generate an additional view from the DIBR-based 3D video data.

5. The method of claim 1, wherein estimating the ideal depth map includes estimating the ideal depth map in accordance with the following equation:

$$Z_{IDEAL} \approx \frac{\pm FB}{f(I_R, I_g) \pm \frac{FB}{Z}},$$

wherein $I_R$ represents a reference view, Ig represents a view generated from the DIBR-based 3D video data, F represents a focal length of the virtual 3D image capture device used to generate an additional view from the DIBR-based 3D video data, and B represents a baseline of the 3D virtual image capture device used to generate the additional view from the DIBR-based 3D video data, wherein the function $f(I_R, I_g)$ represents a difference in intensity between each block of pixels in the reference view $I_R$ and each corresponding block of pixels in the generated view Ig after applying a horizontal shift to the blocks of the reference view,
wherein the amount of the horizontal shift is the average disparity at that particular block, and
wherein the average disparity is a function of a depth map of the reference view.

6. The method of claim 1,
wherein deriving the distortion metrics comprises:
deriving the spatial error outliers (SO) distortion metric as standard deviation of a difference between an ideal depth map and the depth map of the DIBR-based 3D video data; and
deriving the temporal error outliers (TO) distortion metric as a standard deviation of a difference between the ideal depth map and the depth map of the DIBR-based 3D video data for two consecutive frames of the 3D video,
wherein the method further comprises deriving the temporal inconsistency (TI) distortion metric as a standard deviation of the difference between depth maps used to generate DIBR-based 3D video data and a successive DIBR-based 3D video data,
wherein computing the objective metric comprises:
normalizing each of the SO, TO and TI distortion metrics to a range of zero to one; and
computing the objective metric in accordance with the following equation:

$$3VQM = K(1 - SO(SO \cap TO))^a (1 - TI)^b (1 - TO)^c,$$

wherein 3VQM represents the objective metric, SO, TO, and SI represent the normalized SO, TO and TI distortion metrics and a, b, and c represent constants determined by training sequences and k represents a scaling factor.

7. The method of claim 1,
wherein the DIBR-based 3D video data further includes a provided view, and
wherein the method further comprises:
estimating the depth map from 3D video data in accordance with one or more parameters, wherein the 3D video data includes a left view and a right view, wherein the provided view is selected from one of the left and right views; and
revising the one or more parameters used to estimate the depth map for the 3D video data so as to correct for deficiencies identified by the objective metric.

8. The method of claim 1,
wherein the DIBR-based 3D video data further includes a provided view, and
wherein the method further comprises:
encoding the depth map and the provided view of the DIBR-based 3D video data in accordance with one or more parameters to generate encoded DIBR-based 3D video data; and
revising the one or more parameters used to encode one or more of the depth map and the provided view to correct for deficiencies identified by the objective metric.

9. The method of claim 1,
wherein the 3D video data further includes a provided view, and
wherein the method further comprises:
decoding an encoded version of the depth map and an encoded version of the provided view in accordance with one or more parameters to generate the depth map and the provided view; and
revising the one or more parameters used to decode the encoded version of the depth map and the encoded version of the provided view so as to correct for deficiencies identified by the objective metric.

10. The method of claim 1, wherein the DIBR-based 3D video data further includes a provided view, and wherein the method further comprises:

reconstructing either a left view or a right view of 3D video data from the depth map and the provided view in accordance with one or more parameters to generate the 3D video data, wherein the provided view is selected as either the left view or the right view of the 3D video data; and revising the one or more parameters used to reconstruct either the left view or the right view to correct for deficiencies identified by the objective metric.

11. A device that obtains an objective metric to quantify the visual quality of depth-image-based rendering (DIER)-based three-dimensional (3D) video data, the device comprising:

a 3D analysis unit that computes the 3D objective metric, wherein the 3D analysis unit includes:

an ideal depth estimation unit that estimates an ideal depth map that would generate a distortion limited image view using DIER-based 3D video data based on a combination of a view generated from the DIER-based 3D video data, a focal length of a virtual 3D image capture device, and a baseline of the virtual 3D capture device;

a distortion metric computation unit that derives distortion metrics comprising a spatial error outliers distortion metric, a temporal error outliers distortion metric, and a temporal inconsistency distortion metric based on quantitative comparison of the ideal depth and a depth map used in the generation of the DIER-based 3D video data; and an objective metric computation unit that computes the objective metric to quantify visual quality of DIER-based video data based on the derived distortion metrics comprising the spatial error outliers distortion metric, the temporal error outliers distortion metric, and the temporal inconsistency distortion metric.

12. The device of claim 11, wherein each of the distortion metrics indicates a measurement of 3D viewing visual discomfort expected when viewing the DIBR-based 3D video data.

13. The device of claim 11, wherein the ideal depth map estimation unit estimates the ideal depth map in accordance with the following equation:

$$Z_{IDEAL} = \frac{\pm FB}{k(I_o - I_g) \pm \frac{FB}{Z}},$$

wherein Ig represents a view generated from the DIBR-based 3D video data, Io represents an original image, Z represents the depth map of the DIBR-based 3D video data, F represents a focal length of a virtual 3D capture device used to generate a different view from the DIBR-based 3D video data, and B represents a baseline of the virtual 3D capture device used to generate a different view from the DIBR-based 3D video data.

14. The device of claim 11, wherein the ideal depth map estimation unit estimates the ideal depth map in accordance with the following equation:

$$Z_{IDEAL} = \frac{\pm FB}{k(I_R - I_g) \pm FB\left(\frac{1}{Z_L} + \frac{1}{Z_R}\right) + h},$$

wherein $I_R$ represents a reference view, Ig represents a view generated from the DIBR-based 3D video data, $Z_L$ represents a depth map of the DIBR-based 3D video data from an original left eye view, $Z_R$ represents a depth map of the DIBR-based 3D video data from an original right eye view, k represents a first constant, h represents a second constant, F represents a focal length of the virtual 3D image capture device used to generate an additional view from the DIBR-based 3D video data, and B represents a baseline of the virtual 3D image capture device used to generate an additional view from the DIBR-based 3D video data.

15. The device of claim 11, wherein the ideal depth map estimation unit estimates the ideal depth map in accordance with the following equation:

$$Z_{IDEAL} \approx \frac{\pm FB}{f(I_R - I_g) \pm \frac{FB}{Z}},$$

wherein $I_R$ represents a reference view, Ig represents a view generated from the DIBR-based 3D video data, F represents a focal length of the virtual 3D image capture device used to generate an additional view from the DIBR-based 3D video data, and B represents a baseline of the 3D virtual image capture device used to generate the additional view from the DIBR-based 3D video data, wherein the function $f(I_R, I_g)$ represents a difference in intensity between each block of pixels in the reference view $I_R$ and each corresponding block of pixels in the generated view Ig after applying a horizontal shift to the blocks of the reference view, wherein the amount of the horizontal shift is the average disparity at that particular block, and wherein the average disparity is a function of a depth map of the reference view.

16. The device of claim 11, wherein the distortion metric computation unit derives the spatial error outliers (SO) distortion metric as standard deviation of a difference between an ideal depth map and the depth map of the DIBR-based 3D video data, the temporal error outliers (TO) distortion metric as a standard deviation of a difference between the ideal depth map and the depth map of the DIBR-based 3D video data for two consecutive frames of the 3D video and the temporal inconsistency (TI) distortion metric as a standard deviation of the difference between depth maps used to generate DIBR-based 3D video data and a successive DIBR-based 3D video data, wherein an objective metric computation unit normalizes each of the SO, TO and TI distortion metrics to a range of zero to one and computing the objective metric in accordance with the following equation:

$$3VQM = K(1 - SO(SO \cap TO))^a (1 - TI)^b (1 - TO)^c,$$

wherein 3VQM represents the objective metric, SO, TO, and SI represent the normalized SO, TO and TI distortion metrics and a, b, and c represent constants determined by training sequences and k represents a scaling factor.

17. The device of claim 11,
wherein the DIBR-based 3D video data further includes a provided view, and
wherein the device further includes a depth estimation unit that estimates the depth map from 3D video data in accordance with one or more parameters, wherein the 3D video data includes a left view and a right view, wherein the provided view is selected from one of the left and right views and revises the one or more parameters used to estimate the depth map for the 3D video data so as to correct for deficiencies identified by the objective metric.

18. The device of claim 11,
wherein the DIBR-based 3D video data further includes a provided view, and
wherein the device further includes a 3D video encoder that encodes the depth map and the provided view of the DIBR-based 3D video data in accordance with one or more parameters to generate encoded DIBR-based 3D video data and revises the one or more parameters used to encode one or more of the depth map and the provided view to correct for deficiencies identified by the objective metric.

19. The device of claim 11,
wherein the 3D video data further includes a provided view, and
wherein the device further comprises a 3D video decoder that decodes an encoded version of the depth map and an encoded version of the provided view in accordance with one or more parameters to generate the depth map and the provided view and revises the one or more parameters used to decode the encoded version of the depth map and the encoded version of the provided view so as to correct for deficiencies identified by the objective metric.

20. The device of claim 11,
wherein the DIBR-based 3D video data further includes a provided view, and
wherein the device further comprises a view reconstruction unit that reconstructs either a left view or a right view of 3D video data from the depth map and the provided view in accordance with one or more parameters to generate the 3D video data, wherein the provided view is selected as either the left view or the right view of the 3D video data and revises the one or more parameters used to reconstruct either the left view or the right view to correct for deficiencies identified by the objective metric.

21. An apparatus that obtains an objective metric to quantify the visual quality of depth-image-based rendering (DIER)-based three-dimensional (3D) video data, the apparatus comprising:
means for estimating an ideal depth map that would generate a distortion limited image view using DIER-based 3D video data based on a combination of a view generated from the DIER-based 3D video data, a focal length of a virtual 3D image capture device, and a baseline of the virtual 3D capture device;
means for deriving distortion metrics comprising a spatial error outliers distortion metric, a temporal error outliers distortion metric, and a temporal inconsistency distortion metric based on quantitative comparison of the ideal depth map to a depth map used in the generation of the DIER-based 3D video data; and
means for computing the objective metric to quantify visual quality of the DIER-based 3D video data based on the derived distortion metrics comprising the spatial error outliers distortion metric, the temporal error outliers distortion metric, and the temporal inconsistency distortion metric.

22. The apparatus of claim 21, wherein each of the distortion metrics indicates a measurement of 3D viewing visual discomfort expected when viewing the DIBR-based 3D video data.

23. The apparatus of claim 21, further comprising means for estimating the ideal depth map in accordance with the following equation:

$$Z_{IDEAL} = \frac{\pm FB}{k(I_o - I_g) \pm \frac{FB}{Z}},$$

wherein Ig represents a view generated from the DIBR-based 3D video data, Io represents an original image, Z represents the depth map of the DIBR-based 3D video data, F represents a focal length of a virtual 3D capture device used to generate a different view from the DIBR-based 3D video data, and B represents a baseline of the virtual 3D capture device used to generate a different view from the DIBR-based 3D video data.

24. The apparatus of claim 21, further comprising means for estimating the ideal depth map in accordance with the following equation:

$$Z_{IDEAL} = \frac{\pm FB}{k(I_R - I_g) \pm FB\left(\frac{1}{Z_L} + \frac{1}{Z_R}\right) + h},$$

wherein $I_R$ represents a reference view, Ig represents a view generated from the DIBR-based 3D video data, $Z_L$ represents a depth map of the DIBR-based 3D video data from an original left eye view, $Z_R$ represents a depth map of the DIBR-based 3D video data from an original right eye view, k represents a first constant, h represents a second constant, F represents a focal length of the virtual 3D image capture device used to generate an additional view from the DIBR-based 3D video data, and B represents a baseline of the virtual 3D image capture device used to generate an additional view from the DIBR-based 3D video data.

25. The apparatus of claim 21, further comprising means for estimating the ideal depth map in accordance with the following equation:

$$Z_{IDEAL} \approx \frac{\pm FB}{f(I_R, I_g) \pm \frac{FB}{Z}},$$

wherein $I_R$ represents a reference view, Ig represents a view generated from the DIBR-based 3D video data, F represents a focal length of the virtual 3D image capture device used to generate an additional view from the DIBR-based 3D video data, and B represents a baseline of the 3D virtual image capture device used to generate the additional view from the DIBR-based 3D video data,
wherein the function $f(I_R, I_g)$ represents a difference in intensity between each block of pixels in the reference view $I_R$ and each corresponding block of pixels in the generated view Ig after applying a horizontal shift to the blocks of the reference view, wherein the amount of the horizontal shift is the average disparity at that particular block, and
wherein the average disparity is a function of a depth map of the reference view.

26. The apparatus of claim 21, further comprising:
means for deriving the spatial error outliers (SO) distortion metric as standard deviation of a difference between an ideal depth map and the depth map of the DIBR-based 3D video data; and
means for deriving the temporal error outliers (TO) distortion metric as a standard deviation of a difference between the ideal depth map and the depth map of the DIBR-based 3D video data for two consecutive frames of the 3D video;
means for deriving the temporal inconsistency (TI) distortion metric as a standard deviation of the difference between depth maps used to generate DIBR-based 3D video data and a successive DIBR-based 3D video data;
means for normalizing each of the SO, TO and TI distortion metrics to a range of zero to one; and
means for computing the objective metric in accordance with the following equation:

$$3VQM = K(1-SO(SO \cap TO))^a(1-TI)^b(1-TO)^c,$$

wherein 3VQM represents the objective metric, SO, TO, and SI represent the normalized SO, TO and TI distortion metrics and a, b, and c represent constants determined by training sequences and k represents a scaling factor.

27. The apparatus of claim 21,
wherein the DIBR-based 3D video data further includes a provided view, and
wherein the apparatus further comprises:
means for estimating the depth map from 3D video data in accordance with one or more parameters, wherein the 3D video data includes a left view and a right view, wherein the provided view is selected from one of the left and right views; and
means for revising the one or more parameters used to estimate the depth map for the 3D video data so as to correct for deficiencies identified by the objective metric.

28. The apparatus of claim 21,
wherein the DIBR-based 3D video data further includes a provided view, and
wherein the apparatus further comprises:
means for encoding the depth map and the provided view of the DIBR-based 3D video data in accordance with one or more parameters to generate encoded DIBR-based 3D video data; and
means for revising the one or more parameters used to encode one or more of the depth map and the provided view to correct for deficiencies identified by the objective metric.

29. The apparatus of claim 21,
wherein the 3D video data further includes a provided view, and
wherein the apparatus further comprises:
means for decoding an encoded version of the depth map and an encoded version of the provided view in accordance with one or more parameters to generate the depth map and the provided view; and
means for revising the one or more parameters used to decode the encoded version of the depth map and the encoded version of the provided view so as to correct for deficiencies identified by the objective metric.

30. The method of claim 21,
wherein the DIBR-based 3D video data further includes a provided view, and
wherein the apparatus further comprises:
means for reconstructing either a left view or a right view of 3D video data from the depth map and the provided view in accordance with one or more parameters to generate the 3D video data, wherein the provided view is selected as either the left view or the right view of the 3D video data; and
means for revising the one or more parameters used to reconstruct either the left view or the right view to correct for deficiencies identified by the objective metric.

31. A non-transitory computer-readable medium comprising instructions that, when executed, cause one or more processor to:
estimate an ideal depth map that would generate a distortion limited image view using DIER-based 3D video data based on a combination of a view generated from the DIER-based 3D video data, a focal length of a virtual 3D image capture device, and a baseline of the virtual 3D capture device;
derive distortion metrics comprising a spatial error outliers distortion metric, a temporal error outliers distortion metric, and a temporal inconsistency distortion metric based on quantitative comparison of the ideal depth map to a depth map used in the generation of the DIER-based 3D video data; and
compute the objective metric to quantify visual quality of the DIER-based 3D video data based on the derived distortion metrics comprising the spatial error outliers distortion metric, the temporal error outliers distortion metric, and the temporal inconsistency distortion metric.

32. The non-transitory computer-readable medium of claim 31, wherein each of the distortion metrics indicates a measurement of 3D viewing visual discomfort expected when viewing the DIBR-based 3D video data.

33. The non-transitory computer-readable medium of claim 31, further comprising instructions that cause the one or more processors to estimate the ideal depth map includes estimating the ideal depth map in accordance with the following equation:

$$Z_{IDEAL} = \frac{\pm FB}{k(I_o - I_g) \pm \frac{FB}{Z}},$$

wherein Ig represents a view generated from the DIBR-based 3D video data, Io represents an original image, Z represents the depth map of the DIBR-based 3D video data, F represents a focal length of a virtual 3D capture device used to generate a different view from the DIBR-based 3D video data, and B represents a baseline of the virtual 3D capture device used to generate a different view from the DIBR-based 3D video data.

34. The non-transitory computer-readable medium of claim 31, further comprising instructions that cause the one or more processors to estimate the ideal depth map in accordance with the following equation:

$$Z_{IDEAL} = \frac{\pm FB}{k(I_R - I_g) \pm FB\left(\frac{1}{Z_L} + \frac{1}{Z_R}\right) + h},$$

wherein $I_R$ represents a reference view, Ig represents a view generated from the DIBR-based 3D video data, $Z_L$ represents a depth map of the DIBR-based 3D video data from an original left eye view, $Z_R$ represents a depth map of the DIBR-based 3D video data from an original right eye view, k represents a first constant, h represents a second constant, F represents a focal length of the virtual 3D image capture device used to generate an additional view from the DIBR-based 3D video data, and B represents a baseline of the virtual 3D image capture device used to generate an additional view from the DIBR-based 3D video data.

35. The non-transitory computer-readable medium of claim 31, non-transitory computer-readable medium the ideal depth map in accordance with the following equation:

$$Z_{IDEAL} \approx \frac{\pm FB}{f(I_R, I_g) \pm \frac{FB}{Z}},$$

wherein $I_R$ represents a reference view, Ig represents a view generated from the DIBR-based 3D video data, F represents a focal length of the virtual 3D image capture device used to generate an additional view from the DIBR-based 3D video data, and B represents a baseline of the 3D virtual image capture device used to generate the additional view from the DIBR-based 3D video data, wherein the function $f(I_R, I_g)$ represents a difference in intensity between each block of pixels in the reference view $I_R$ and each corresponding block of pixels in the generated view Ig after applying a horizontal shift to the blocks of the reference view,
wherein the amount of the horizontal shift is the average disparity at that particular block, and
wherein the average disparity is a function of a depth map of the reference view.

36. The non-transitory computer-readable medium of claim 31, further comprising instructions that cause the one or more processors to estimate
derive the spatial error outliers (SO) distortion metric as standard deviation of a difference between an ideal depth map and the depth map of the DIBR-based 3D video data;
derive the temporal error outliers (TO) distortion metric as a standard deviation of a difference between the ideal depth map and the depth map of the DIBR-based 3D video data for two consecutive frames of the 3D video;
derive the temporal inconsistency (TI) distortion metric as a standard deviation of the difference between depth maps used to generate DIBR-based 3D video data and a successive DIBR-based 3D video data,
normalize each of the SO, TO and TI distortion metrics to a range of zero to one; and
compute the objective metric in accordance with the following equation:

$3VQM = K(1-SO(SO \cap TO))^a(1-TI)^b(1-TO)^c$, wherein 3VQM represents the objective metric, SO, TO, and SI represent the normalized SO, TO and TI distortion metrics and a, b, and c represent constants determined by training sequences and k represents a scaling factor.

37. The non-transitory computer-readable medium of claim 31,
wherein the DIBR-based 3D video data further includes a provided view, and
further comprising instructions that cause the one or more processors to: estimate the depth map from 3D video data in accordance with one or more parameters, wherein the 3D video data includes a left view and a right view, wherein the provided view is selected from one of the left and right views; and
revise the one or more parameters used to estimate the depth map for the 3D video data so as to correct for deficiencies identified by the objective metric.

38. The non-transitory computer-readable medium of claim 31,
wherein the DIBR-based 3D video data further includes a provided view, and
further comprising instructions that cause the one or more processors to:
encode the depth map and the provided view of the DIBR-based 3D video data in accordance with one or more parameters to generate encoded DIBR-based 3D video data; and
revise the one or more parameters used to encode one or more of the depth map and the provided view to correct for deficiencies identified by the objective metric.

39. The non-transitory computer-readable medium of claim 31,
wherein the 3D video data further includes a provided view, and
further comprising instructions that cause the one or more processors to:
decode an encoded version of the depth map and an encoded version of the provided view in accordance with one or more parameters to generate the depth map and the provided view; and
revise the one or more parameters used to decode the encoded version of the depth map and the encoded version of the provided view so as to correct for deficiencies identified by the objective metric.

40. The non-transitory computer-readable medium of claim 31,
wherein the DIBR-based 3D video data further includes a provided view, and
further comprising instructions that cause the one or more processors to:
reconstruct either a left view or a right view of 3D video data from the depth map and the provided view in accordance with one or more parameters to generate the 3D video data, wherein the provided view is selected as either the left view or the right view of the 3D video data; and
revise the one or more parameters used to reconstruct either the left view or the right view to correct for deficiencies identified by the objective metric.

* * * * *